United States Patent
Ishizuka et al.

(10) Patent No.: US 8,116,619 B2
(45) Date of Patent: Feb. 14, 2012

(54) IMAGE PICKUP APPARATUS

(75) Inventors: Kazunori Ishizuka, Kawasaki (JP); Koji Nagaoka, Hino (JP); Shohei Uehara, Fuchu (JP); Shohei Aoki, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 128 days.

(21) Appl. No.: 12/800,334

(22) Filed: May 12, 2010

(65) Prior Publication Data

US 2010/0290770 A1 Nov. 18, 2010

(30) Foreign Application Priority Data

May 14, 2009 (JP) .................. 2009-117798

(51) Int. Cl.
*G03B 17/00* (2006.01)

(52) U.S. Cl. ........................................ 396/55

(58) Field of Classification Search .............. 396/55; 348/208.2, 208.7
See application file for complete search history.

(56) References Cited

U.S. PATENT DOCUMENTS

| | | | |
|---|---|---|---|
| 5,745,802 A * | 4/1998 | Imura | 396/55 |
| 6,456,789 B1 * | 9/2002 | Uenaka | 396/55 |
| 7,613,390 B2 * | 11/2009 | Nomura et al. | 396/542 |

FOREIGN PATENT DOCUMENTS

| | | |
|---|---|---|
| JP | 2008-048220 | 2/2008 |
| JP | 2008-185786 | 8/2008 |

* cited by examiner

*Primary Examiner* — Clayton E Laballe
*Assistant Examiner* — Noam Reisner
(74) *Attorney, Agent, or Firm* — Kenyon & Kenyon LLP

(57) ABSTRACT

An image pickup apparatus of the present invention includes: a fixed frame; a zoom lens holding frame; a focus lens holding frame; a focus driving unit and a zoom driving unit; an image pickup device; a base plate that is coupled to the fixed frame and displaceably supports the image pickup device; an X driving unit that drives the image pickup device in an X direction; and a Y driving unit that drives the image pickup device in a Y direction, wherein the focus driving unit is placed in an upper left portion of the fixed frame, the zoom driving unit is placed in a right side portion, and further the Y driving unit is placed in an upper right corner of the base plate and the X driving unit is placed in a lower right corner.

4 Claims, 18 Drawing Sheets

IMAGE PICKUP APPARATUS

CROSS REFERENCE TO RELATED APPLICATION

This application claims the benefit of Japanese Application No. 2009-117798 filed in Japan on May 14, 2009, the contents of which are incorporated herein by this reference.

BACKGROUND OF THE INVENTION

1. Field of the Invention

The present invention relates to an image pickup apparatus having an image shake correction function.

2. Description of the Related Art

As a conventional image pickup apparatus including an image shake correction device that supports an image pickup device drivably in a two-dimensional direction (X and Y directions) perpendicular to a lens optical axis for image shake correction, an apparatus disclosed in Japanese Patent Application Laid-Open Publication No. 2008-48220 includes a base as a fixed plate member on which a lens barrel having an image pickup optical system and an image pickup device supported by an image shake correction device are mounted.

The conventional image pickup apparatus includes a first movable frame displaceable in a Y direction, and a second movable frame displaceable in an X direction with respect to the first movable frame, and an image pickup device is mounted on the second movable frame. Further, on the base, when viewed from front along the lens optical axis, a first driving section including a Y direction driving motor of the image shake correction device and a second driving section including an X direction driving motor are placed in upper and lower right positions. Further, in upper and lower left positions on a front surface of the base, a focus driving section including a focus motor and a gear driving mechanism, and a zoom driving section including a zoom motor and a gear driving mechanism are placed so as to be secured to a fixed frame of a lens barrel unit.

SUMMARY OF THE INVENTION

The present invention provides an image pickup apparatus including: a fixed frame; an image pickup optical system having a focus lens group and a zoom lens group; a focus lens holding frame holding the focus lens group; a zoom lens holding frame holding the zoom lens group; a focus driving unit provided on an outer peripheral portion of the fixed frame, and including a focus motor for focus driving of the focus lens group and a rotation transmitting mechanism of the focus motor; a zoom driving unit provided on the outer peripheral portion of the fixed frame and including a zoom motor for zoom driving of the zoom lens group and a rotation transmitting mechanism of the zoom motor; an image pickup device that receives an optical image formed via the image pickup optical system; a base member that is coupled to the fixed frame, and supports the image pickup device displaceably in a first direction and a second direction perpendicular to the first direction in a plane parallel to a light receiving surface of the image pickup device; a first driving section provided on the base member, and including a first motor that drives the image pickup device in the first direction; and a second driving section including a second motor that drives the image pickup device in the second direction, wherein the base member includes at least a first corner portion in which the first driving section is mounted, a second corner portion in which the second driving section is mounted, a third corner portion located on a side opposite to the first corner portion via an optical axis of the image pickup optical system, and having a notch that a protruding portion from the fixed frame of the focus driving unit enters, and a fourth corner portion located on a side opposite to the second corner portion via the optical axis of the image pickup optical system, the zoom driving unit is configured so that the zoom motor is placed between the first driving section and the second driving section in an optical axis direction of the image pickup optical system with respect to the fixed frame, and the rotation transmitting mechanism of the zoom motor is placed overlapping the first driving section or the second driving section on a side closer to a subject of the image pickup optical system than the first driving section or the second driving section, and a member placement escape portion is formed in the fourth corner portion of the base member.

DETAILED DESCRIPTION OF THE PREFERRED EMBODIMENTS

A lens barrel that constitutes an image pickup apparatus according to an embodiment of the present invention will be described with reference to FIGS. 1 to 18.

A lens barrel 1 of the present embodiment is a retractable lens barrel including an image pickup optical system constituted by a first group lens having positive refractive power, a second group lens having negative refractive power, a third group lens having positive refractive power, and a fourth group lens having positive refractive power, with each movable frame member being retracted in a non-photographing state, and can be further mounted in a digital camera as an image pickup apparatus having an image shake correction function with an image pickup device movable on an image forming plane of the optical system.

In the description below, a photographing lens optical axis of the image pickup optical system is denoted by "O". In the optical axis O direction, a subject side direction is a front direction and an image forming side direction is a rear direction. Also, a direction perpendicular to the optical axis O, which is a lateral direction viewed from a front side, is an X direction as a first direction, and particularly a right direction is a +X side. A direction perpendicular to the optical axis O and the X direction (vertical direction) is a Y direction as a second direction, and particularly an upper direction is a +Y side. A plane perpendicular to the optical axis O is an XY plane.

Figure 6:
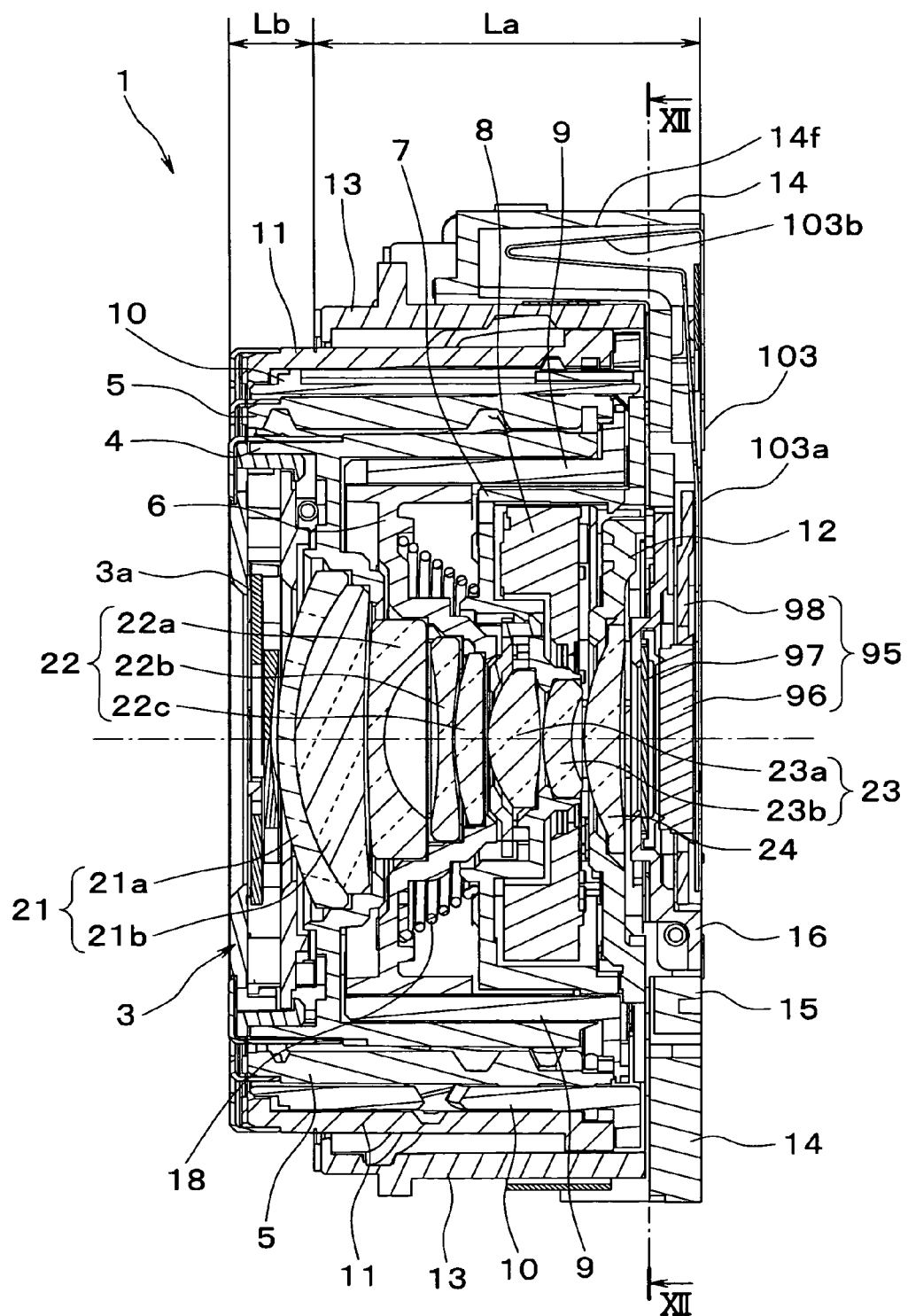
FIG. 6 is a vertical sectional view including a lens optical axis in a retracted state of the lens barrel in FIG. 1.
Figure 7:
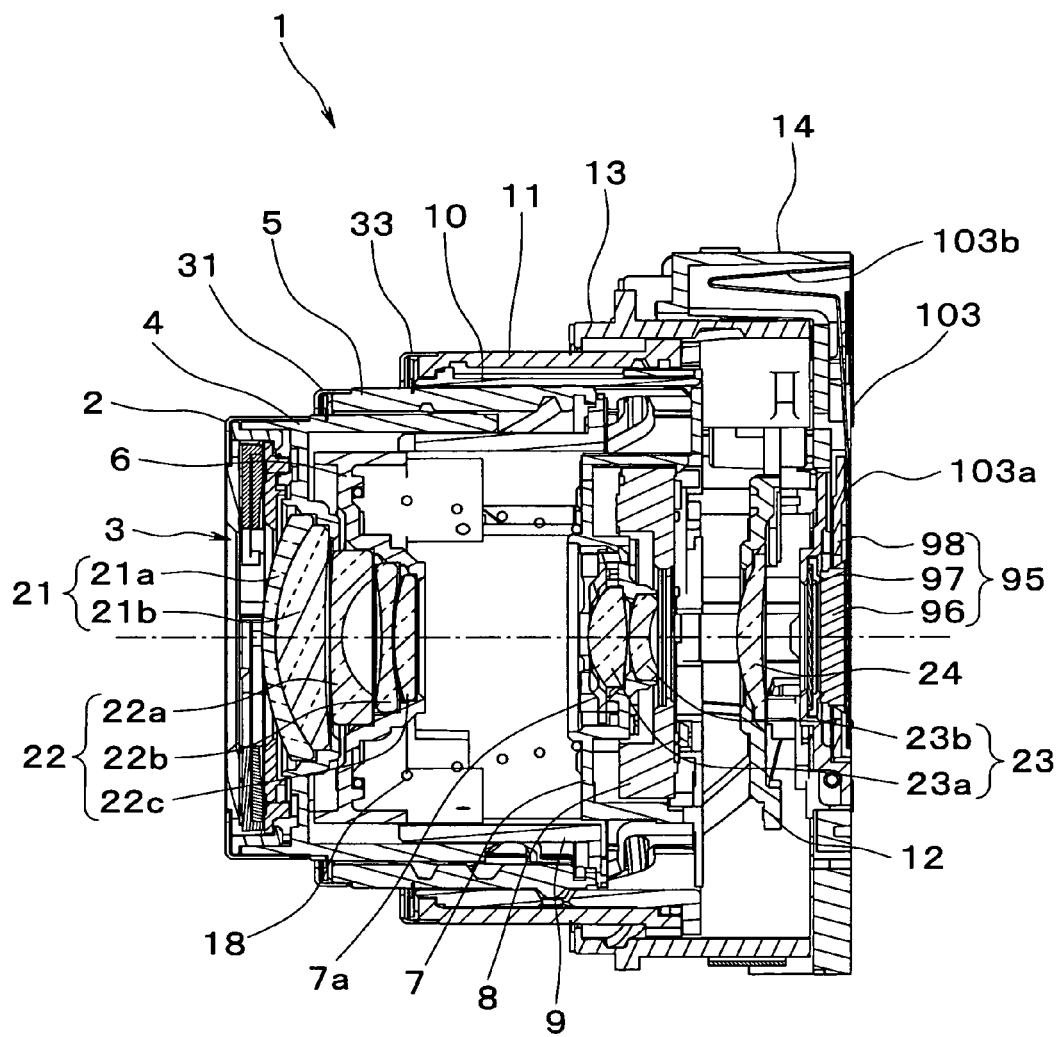
FIG. 7 is a vertical sectional view including the lens optical axis in a photographable wide-angle state of the lens barrel in FIG. 1.
Figure 8:
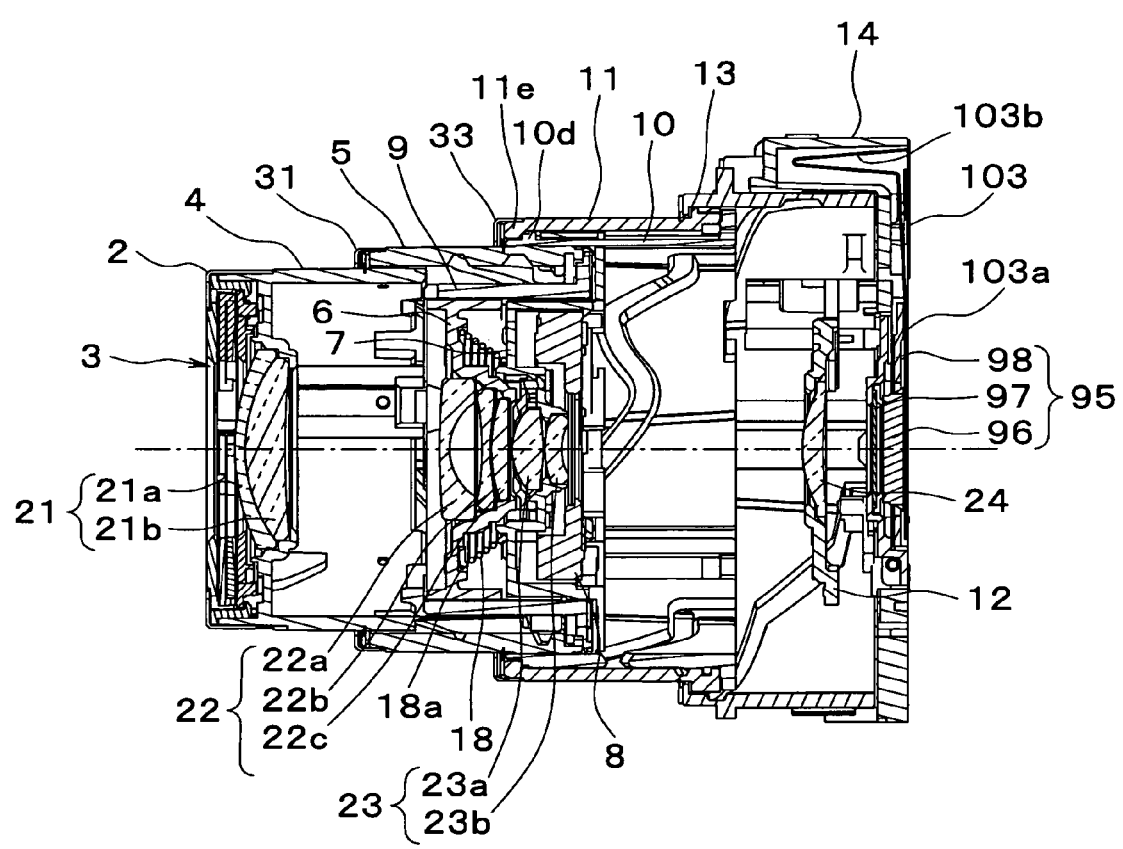
FIG. 8 is a vertical sectional view including the lens optical axis in a photographable telephoto state of the lens barrel in FIG. 1.

When the lens barrel 1 is in a retracted state, as shown in FIG. 6, movable frame members are retracted to a fixed frame 13 described later and brought into substantially tight contact with each other, and an entire length of the barrel is reduced. On the other hand, when the lens barrel 1 is in a photographable zoom wide-angle state and a photographable zoom telephoto state, as shown in FIGS. 7 and 8, the movable frame members are advanced forward in the optical axis O direction, and a first group frame 4, a cam frame 5, a rotating frame 11, and the like described later protrude. In the lens barrel 1, an image pickup device 96 described later is supported movably on the XY plane perpendicular to the optical axis O, and the image pickup device 96 is controlled to be displaced on the XY plane so as to correct camera shake based on a camera shake detection signal detected by the digital camera in photographing.

Figure 1:
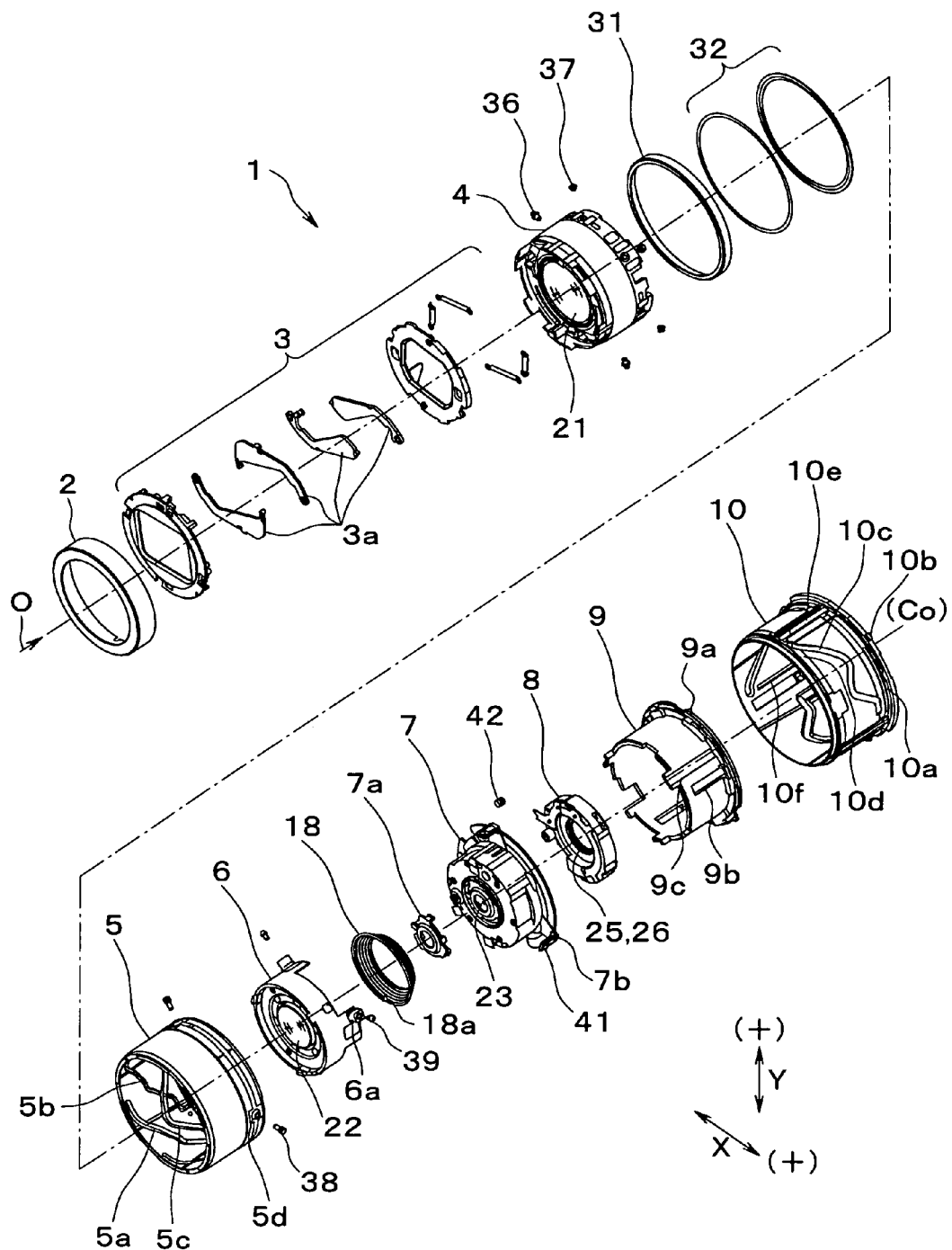
FIG. 1 is an exploded perspective view showing a part of a lens barrel of an image pickup apparatus according to an embodiment of the present invention.
Figure 2:
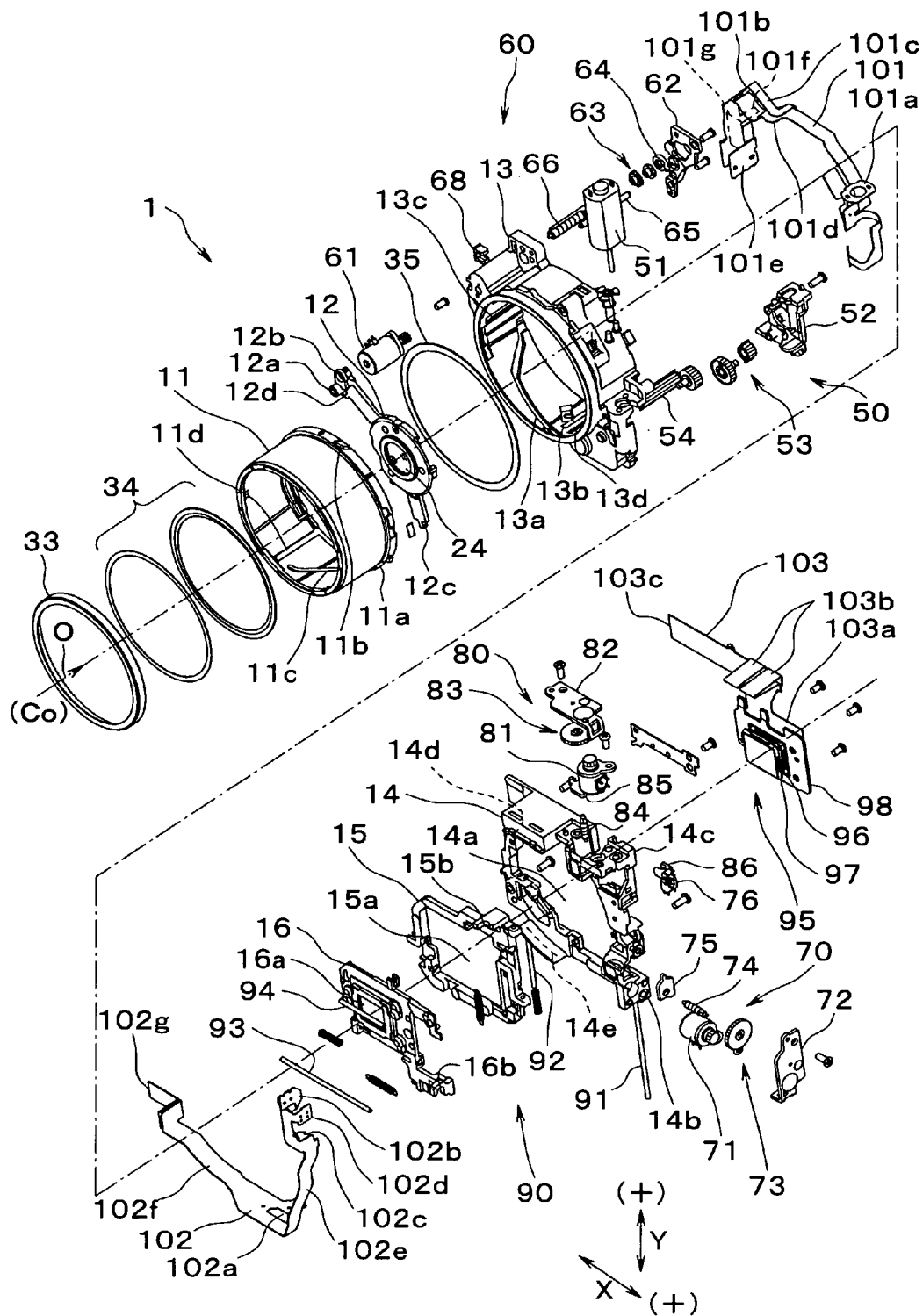
FIG. 2 is an exploded perspective view showing a different part of the lens barrel in FIG. 1.

Main components of the lens barrel 1 are sequentially placed from the front in the optical axis O direction as shown in FIGS. 1 and 2. The lens barrel 1 includes a barrier unit 3 for opening/closing a front surface of a first group lens 21 described later, a first group frame 4 as a zoom lens holding frame holding the first group lens 21, a second group frame 6 as a zoom lens holding frame holding a second group lens 22, a cam frame 5 for driving the first group frame 4 and the second group frame 6 forward and backward, a third group frame 7 as a zoom lens holding frame holding a third group lens 23, which includes a shutter/diaphragm unit 8 on a rear side, a float key 9 as a frame member for controlling rotation of the first and second group frames, a movable frame 10 for driving the cam frame 5 forward and backward and controlling rotation of the third group frame 7 and the float key 9, a rotating frame 11 for rotationally driving the cam frame 5 and driving the third group frame 7 forward and backward, a fourth group frame 12 as a focus lens holding frame holding a fourth group lens 24, a fixed frame 13 that is a fixed frame member for supporting the rotating frame 11 so as to be rotationally movable forward and backward and controlling rotation of the frame 10, and is fixedly supported by a camera body, a zoom driving unit 50 that rotationally drives the rotating frame 11, a focus driving unit 60 that drives the fourth group frame 12 forward and backward, and a shake correction image pickup unit 90 that is assembled to a base plate 14 as a base member, holds the image pickup device 96, and drives the image pickup device 96 to be displaced on the plane perpendicular to the optical axis O direction.

The fixed frame 13 has a cylindrical portion, houses the frame members in an inner peripheral portion, and has a back surface to which the base plate 14 of the shake correction image pickup unit 90 is secured. The fixed frame 13 has a rotating frame cam groove 13a diagonal to the optical axis O direction along the cylinder inner peripheral portion, a movable frame straight guide groove 13c and a fourth group frame straight guide groove 13b in the optical axis O direction, and a gear housing recess 13d that houses a long gear 54 described later. The zoom driving unit 50 is placed along a right side of a cylinder outer peripheral portion, and the focus driving unit 60 is placed in an upper left position of the cylinder outer peripheral portion. A light shielding ring 35 is secured to a front surface.

The rotating frame 11 is a cylindrical frame member, and a rear end outer periphery thereof fits in the inner peripheral portion of the fixed frame 13 so as to be rotationally movable forward and backward. A cam follower 11b is placed on the rear end outer periphery, and slidably fits in the cam groove 13a in the fixed frame 13. A gear portion 11a that meshes with the long gear 54 is provided in a predetermined range of the rear end outer periphery. A third group frame cam groove 11c diagonal to the optical axis O direction, and a cam frame straight groove 11d are provided in an inner peripheral portion of the rotating frame 11.

The rotating frame 11 is rotationally driven by rotation of the long gear driven by the zoom driving unit 50, and then driven forward and backward in the optical axis O direction while being rotated along the cam groove 13a. To a front surface outer peripheral portion of the rotating frame 11, the light shielding ring 34 and a decorative ring 33 are mounted.

The movable frame 10 is a cylindrical frame member, has a rear end bayonet-connected to the rotating frame 11, and is moved forward and backward together with the rotating frame 11 in the optical axis O direction and supported rotatably with respect to the rotating frame 11. A guide pin 10b protruding from the rear end outer periphery engages the straight guide groove 13c in the fixed frame 13. Thus, the movable frame 10 is moved forward and backward together with the rotating frame 11 in a rotation-restricted state.

In a circumferential portion of the movable frame 10, a cam frame cam groove 10c passing through inner and outer peripheries and diagonal to the optical axis O, a third group frame straight guide groove 10e passing through the inner and outer peripheries, and a float key straight guide groove 10f in an inner peripheral portion are provided.

The float key 9 is a cylindrical frame member, has a rear end bayonet-connected to the cam frame 5, and is moved forward and backward together with the cam frame 5 in the optical axis O direction and supported rotatably with respect to the cam frame 5. The float key 9 has a guide protrusion 9a protruding from a rear end outer periphery, a first group frame straight guide groove 9c in an outer peripheral portion, and a second group frame straight guide groove 9b passing through inner and outer peripheries.

The guide protrusion 9a on the float key 9 slidably fits in the straight guide groove 10f in the movable frame 10. Thus, the float key 9 is supported movably forward and backward in the optical axis O direction together with the cam frame 5 in the rotation-restricted state by the movable frame 10.

Figure 18:
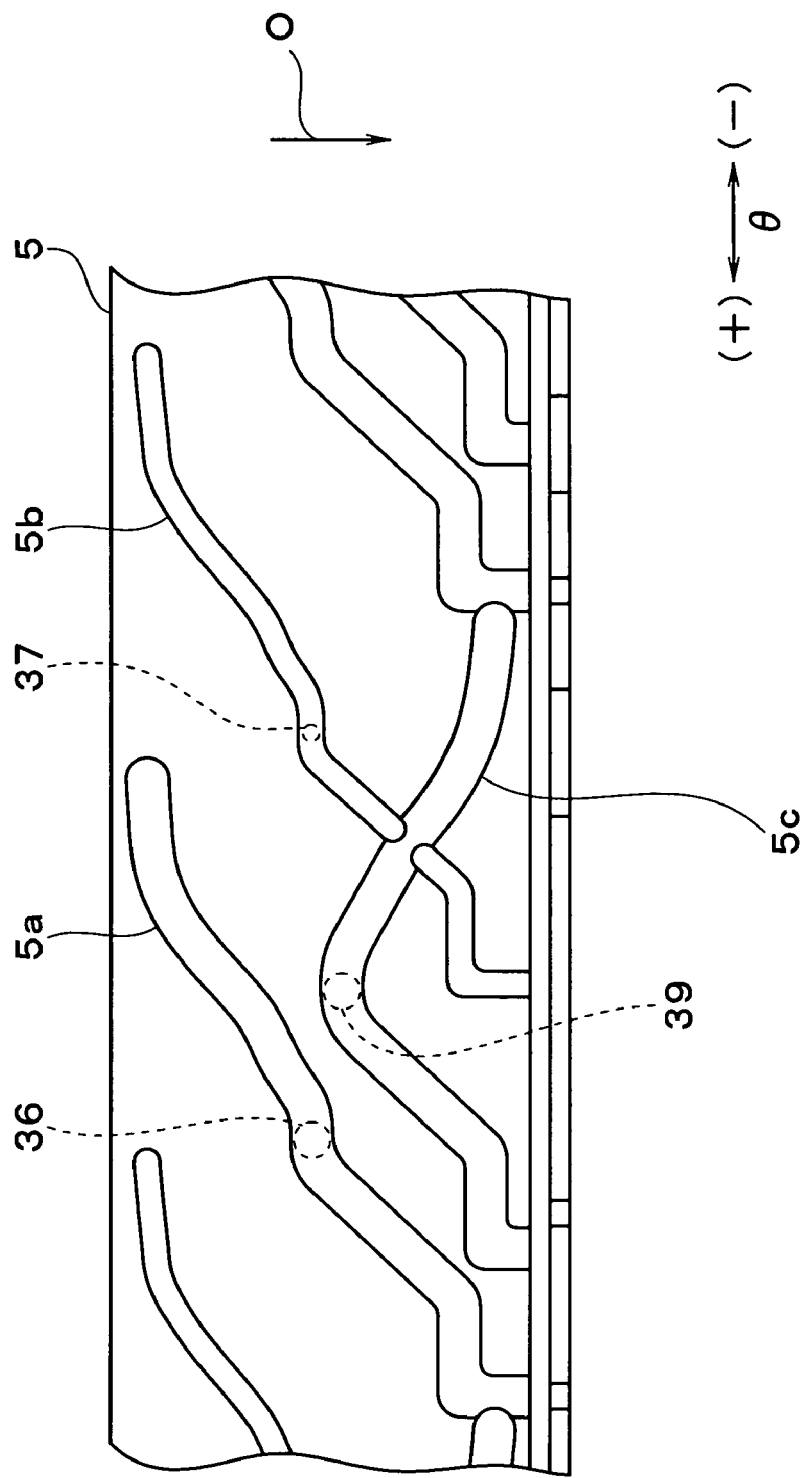
FIG. 18 is a developed view of a cam groove in an inner peripheral portion of a cam frame in FIG. 1.

The cam frame 5 is a cylindrical frame member, fits in and is integrated into the inner peripheral portion of the movable frame 10 so as to be rotationally movable forward and backward. A cam follower 5d protruding from a rear outer peripheral portion is placed on the cam frame 5, and a straight guide pin 38 protruding outward is fitted in and secured to a center of the cam follower 5*d*. In the inner peripheral portion of the cam frame 5, as shown in FIG. 18, three pairs of first group frame cam grooves 5*a* and sub-cam grooves 5*b* having the same cam curve (cam groove central locus) and three second group frame cam grooves 5*c* are provided. In a developed view of the cam frame in FIG. 18, θ denotes a rotation angle with respect to the first group frame 4 and the second group frame 6 of the cam frame 5, a (+) direction denotes an advance rotational direction from the retracted state, and a (−) direction denotes a retraction rotational direction to the retracted state.

Cam followers 36 and 37 described later of the first group frame 4 fit in the pair of the first group frame cam groove 5*a* and the sub-cam groove 5*b*, the cam groove 5*a* functions to drive the first group frame 4 forward and backward, while the sub-cam groove 5*b* functions to prevent removal of the cam follower when an external force in a thrust direction is applied to the first group frame 4 by an impact or the like.

The second group frame cam grooves 5*c* are constituted by cam grooves with different groove widths. When the lens barrel 1 is in the photographable wide-angle state to the photographable telephoto state, a cam follower 39 described later of the second group frame 6 fits in a cam groove without a gap among the cam grooves 5*c*, and when the lens barrel 1 is in the retracted state, the cam follower 39 fits in a cam groove with a gap among the cam grooves 5*c*. This prevents a jam between the first group frame 4 and the second group frame 5 when the lens barrel 1 is in the retracted state.

Figure 9:
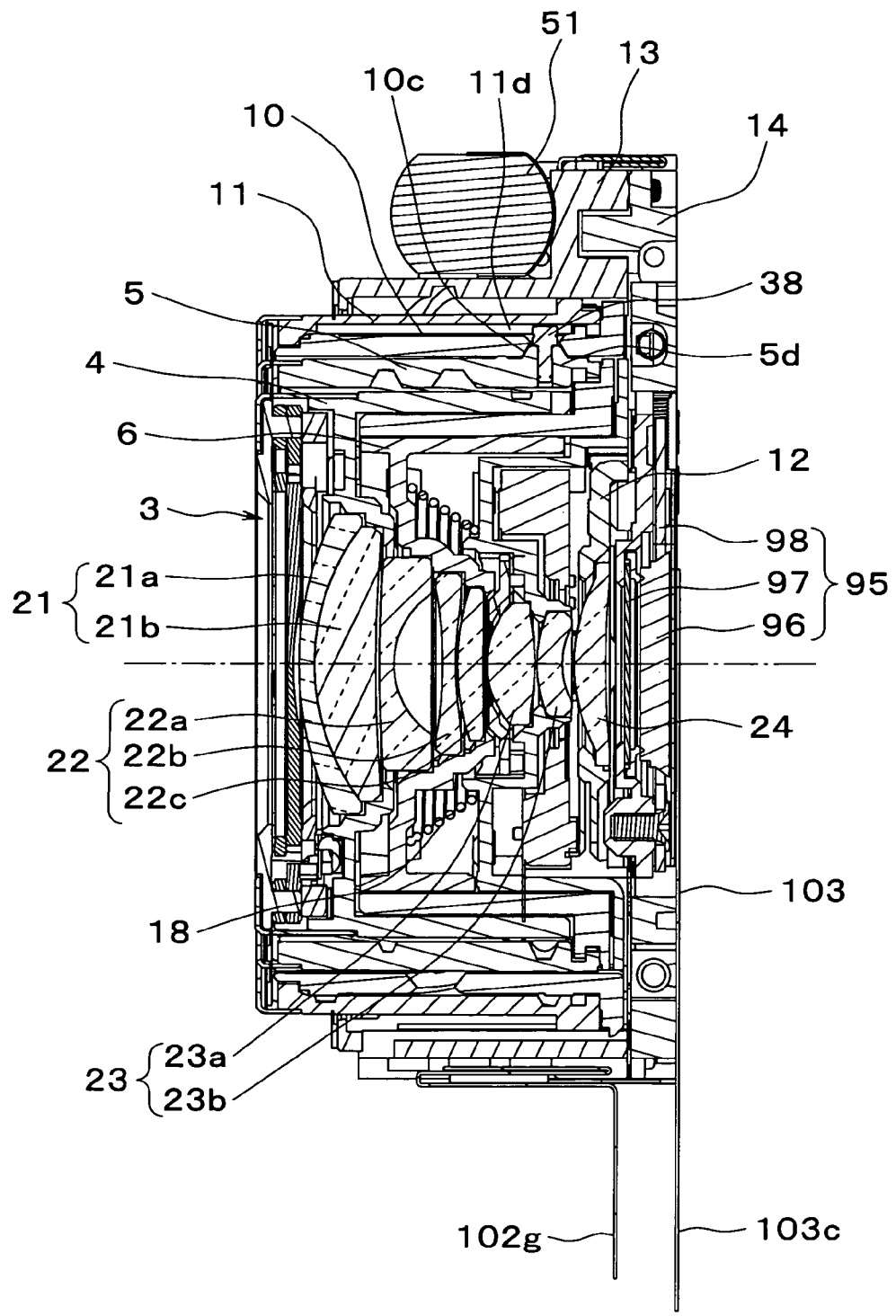
FIG. 9 is a cross sectional view including the lens optical axis in the retracted state of the lens barrel in FIG. 1.

The cam follower 5*d* slidably fits in the cam groove 10*c* in the movable frame 10, the straight guide pin 38 passes through the cam groove 10*c* and then slidably fits in the straight groove 11*d* in the rotating frame 11 (FIG. 9). Thus, the cam frame 5 is rotated together with the rotating frame 11 and supported movably forward and backward in the optical axis O direction along the cam groove 10*c* in the movable frame 10.

When the cam frame 5 is advanced together with the rotating frame 11 in the photographable telephoto state as shown in FIG. 8, the cam follower 5*d* is moved close to a thin part 10*d* on the front side of the cam groove 10*c* in the movable frame 10 (FIG. 1). If a forward external force (tensile force) is applied to the first group frame 4 or the cam frame 5 exposed to the outside in this state, the external force may be applied to the thin part 10*d* on the front side of the movable frame 10 via the cam follower 5*d* to damage the thin part 10*d*. However, the present embodiment adopts a structure in which a front end surface of the movable frame 10 abuts against an inner side step 11*e* (FIG. 8) in the rotating frame 11, thereby preventing the external force from damaging the thin part 10*d* of the movable frame 10.

The barrier unit 3 includes four barrier blades 3*a*, and is covered with the decorative ring 2 and mounted to the front surface of the first group frame 4. The barrier blade 3*a* is retracted with an advancing operation of the first group frame 4 from the retraction position to open the front surface of the first group lens 21. Also, the barrier blade 3*a* is brought into a closed position with retraction of the first group frame 4 from the photographing position to close the front surface of the first group lens 21.

The first group frame 4 is a cylindrical frame member, and fits in the inner peripheral portion of the cam frame 5 movably forward and backward in the rotation-restricted state. The first group frame 4 holds the first group lens 21 as a zoom lens group, and three pairs of cam followers 36 and 37 are secured to an outer peripheral portion of the first group frame 4. A guide protrusion (not shown) that slidably fits in the straight guide groove 9*c* in the float key 9 is provided in an inner peripheral portion of the first group frame 4.

The cam followers 36 and 37 of the first group frame 4 slidably fit in the cam groove 5*a* and the sub-cam groove 5*b*, respectively, of the cam frame 5, and the first group frame 4 is moved forward and backward with rotation and forward and backward movement of the cam frame 5 with rotation of the first group frame 4 being controlled by the straight guide groove 9*c* in the float key 9. The cam follower 37 and the sub-cam groove 5*b* are provided to prevent removal of the cam follower when the external force is applied to the first group frame 4 due to a fall or the like as described above.

The second group frame 6 is a cylindrical frame member, fits in the inner peripheral portion of the float key 9 movably forward and backward in the rotation-restricted state, and is integrated into the rear side of the first group frame 4. The second group frame 6 holds the second group lens 22 as a zoom lens group, and to an outer peripheral portion, three guide protrusions 6*a* are secured and the cam follower 39 is secured so as to protrude outward from the center of the guide protrusion 6*a*.

The guide protrusion 6*a* fits in and passes through the straight guide groove 9*b* in the float key 9, and fits the cam follower 39 in the cam groove 5*c* in the cam frame 5. Thus, the second group frame 6 is moved forward and backward by rotation and forward and backward movement of the cam frame 5 in the rotation-restricted state.

Figure 3:
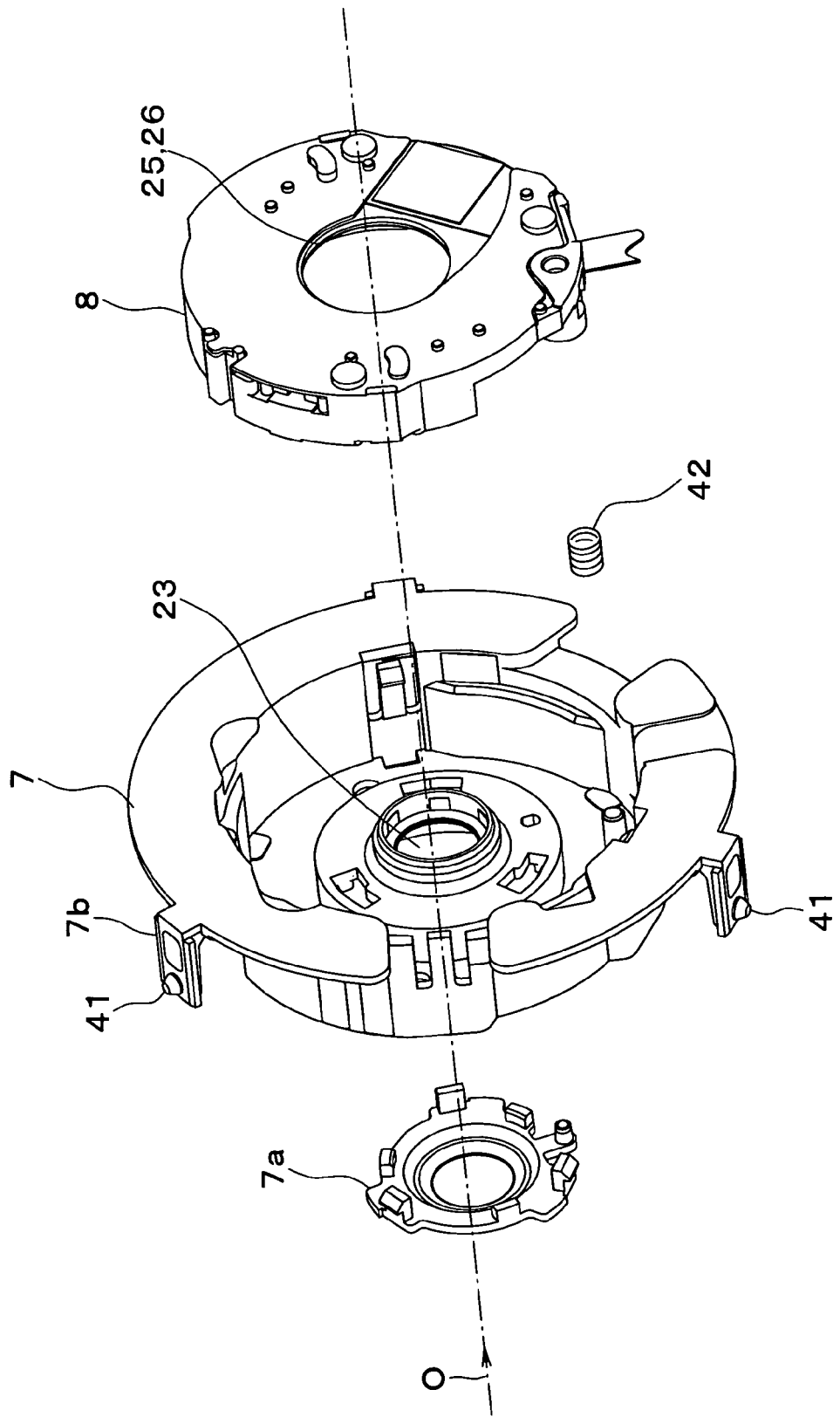
FIG. 3 is an exploded perspective view of a third group frame and a shutter unit in the lens barrel in FIG. 1.
Figure 4:
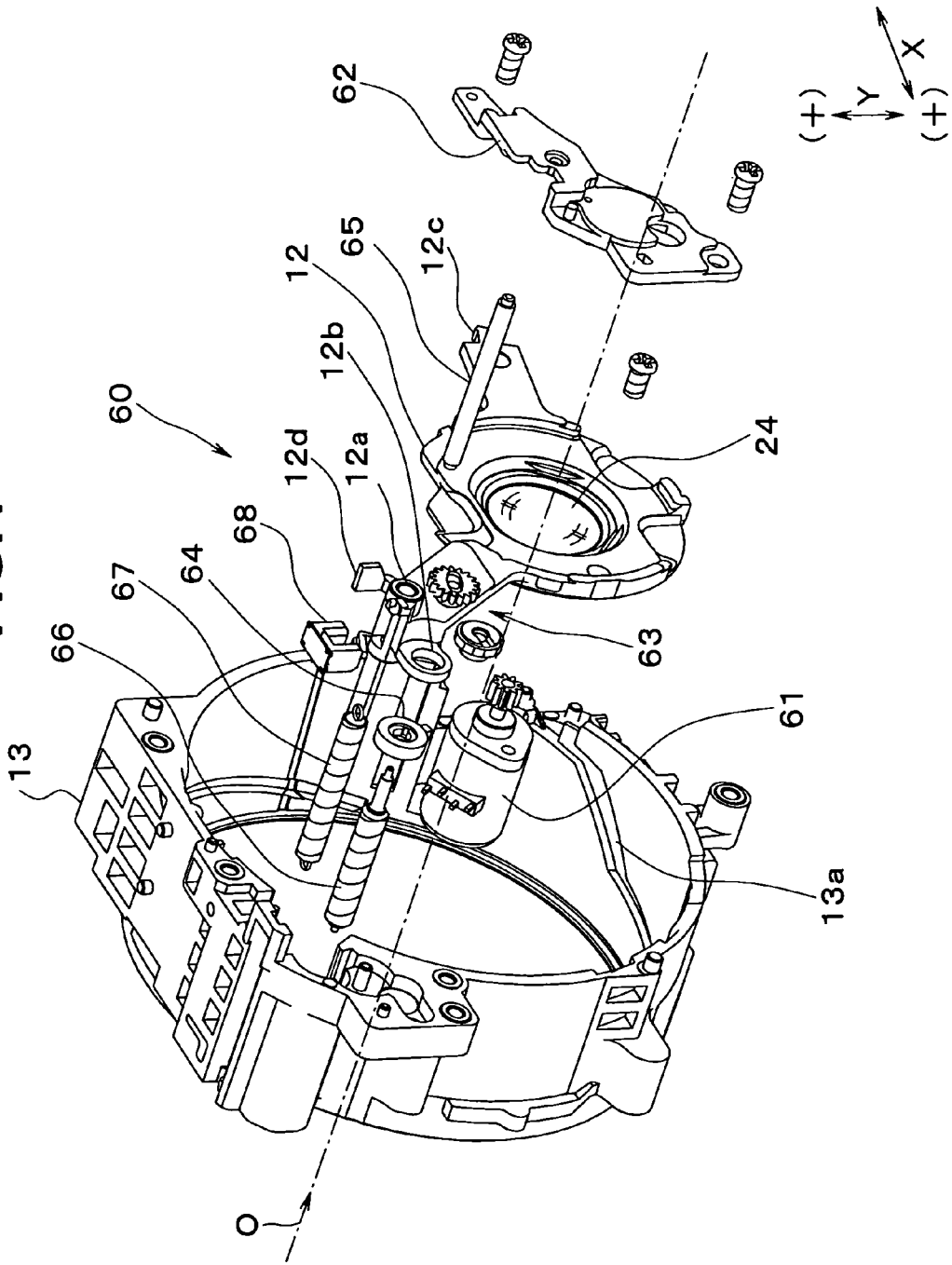
FIG. 4 is an exploded perspective view of a fixed frame, a fourth group frame, and a focus driving unit in the lens barrel in FIG. 1.
Figure 5:
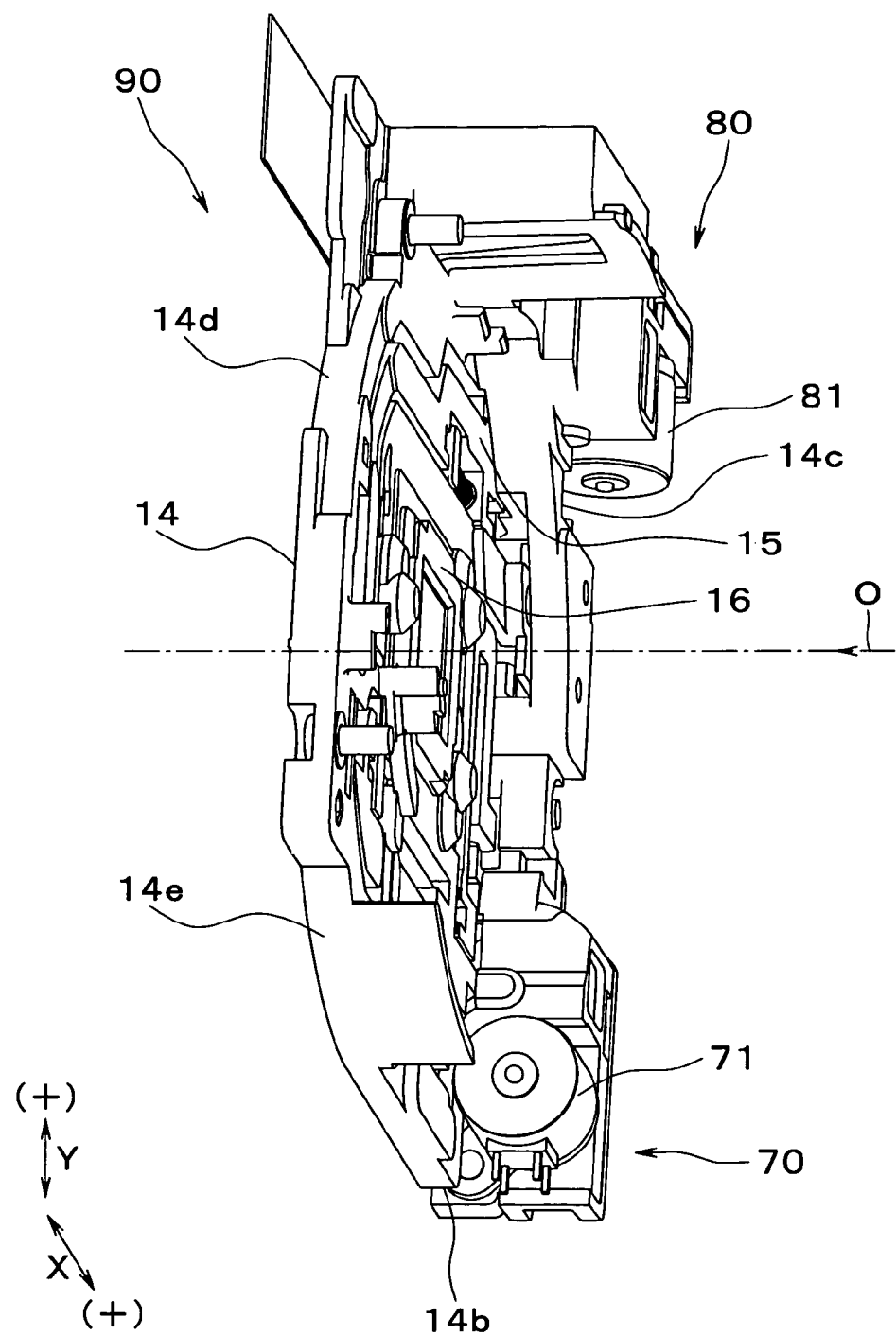
FIG. 5 is a perspective view of a shake correction image pickup unit in the lens barrel in FIG. 1.

The third group frame 7 is a cylindrical frame member, fits in the inner peripheral portion of the float key 9, and is integrated into the rear side of the second group frame 6 movably forward and backward in the rotation-restricted state. The third group frame 7 holds the third group lens 23 as a zoom lens group, and supports the shutter/diaphragm unit 8 on a back side inner peripheral portion relatively movably in the optical axis O direction. A third group lens retainer plate 7*a* is secured to a front side of the third group frame 7. A guide protrusion 7*b* is provided on an arm portion protruding outward of the third group frame 7, and a cam follower 41 is secured to the guide protrusion (FIG. 3).

The third group frame 7 fits the guide protrusion 7*b* in the straight guide groove 10*e* in the movable frame 10, and after the guide protrusion 7*b* passes through the straight guide groove 10*e*, the cam follower 41 is fitted in and assembled to the cam groove 11*c* in the rotating frame 11. Thus, the third group frame 7 is moved forward and backward in the optical axis O direction in the rotation-restricted state with rotation of the rotating frame 11.

A shutter blade 25 for opening/closing a photographing optical path and a diaphragm blade 26 for adjusting an amount of photographing light are incorporated into the shutter/diaphragm unit 8. A compression spring 42 is inserted between the shutter/diaphragm unit 8 and the third group frame 7, and the shutter/diaphragm unit 8 and the third group frame 7 are urged in directions apart from each other.

In the photographable state of the lens barrel 1, the shutter/diaphragm unit 8 and the third group frame 7 are a predetermined distance apart from each other, while in the retracted state, the third group frame 7 is brought close to the base plate 14 described later to compress the compression spring 42, and the shutter/diaphragm unit 8 and the third group frame 7 are brought into substantially tight contact with each other. In the retracted state, the shutter blade 25 and the diaphragm blade 26 are driven to open positions, and a rear portion of the third group lens 23 enters opened apertures. This further brings the shutter/diaphragm unit 8 and the third group frame 7 into substantially tight contact with each other. Further, the shutter/diaphragm unit 8 and the third group frame 7 are brought extremely close to the fourth group lens 24.

A conical coil spring 18 as an urging member for urging the second and third group frames is inserted between the second group frame 6 and the third group frame 7, and the second group frame 6 and the third group frame 7 are urged to be apart from each other in the optical axis O direction (FIGS. 6 to 8). As described above, the second group frame 6 and the third group frame 7 are urged to be apart from each other, and when the lens barrel 1 is in the photographable state including the retracted state, fitting backlashes between the cam follower 39 of the second group frame 6 and the cam groove 5c in the cam frame 5, and the cam follower 41 of the third group frame 7 and the cam groove 11c in the rotating frame 11 are eliminated, thereby allowing the second group frame 6 and the third group frame 7 to be driven forward and backward in the optical axis O direction without backlash.

The conical coil spring 18 has a bent portion 18a bent toward an inner diameter side at a large diameter side end turn portion. When the conical coil spring 18 is integrated between the second group frame 6 and the third group frame 7, the large diameter side end turn portion is abutted against an end surface of the second group frame 6. When the lens barrel 1 is retracted to the retracted state, as shown in FIG. 6, the conical coil spring 18 is compressed and brought into substantially tight contact, but the bent portion 18a prevents an adjacent winding from fitting in the large diameter side end turn portion and avoids an unrestored state of the spring 18.

The fourth group frame 12 is placed behind the shutter/diaphragm unit 8 movably forward and backward in the rotation-restricted state. The fourth group frame 12 holds the fourth group lens 24 as a focus lens group in a middle aperture, and has two arm portions extending outward. A guide protrusion 12c is provided on one arm portion, and a guide shaft hole 12a, a feed screw insertion hole 12b, and a sensor shielding piece 12d are provided on the other arm portion.

A guide shaft 65 supported by the fixed frame 13 slidably fits in the guide shaft hole 12a. The guide protrusion 12c includes two minute cylindrical portions formed to protrude on opposite sides (circumferential direction) around the optical axis O and extending in parallel with the optical axis O, and slidably fits in the straight guide groove 13b in the fixed frame 13. Thus, the fourth group frame 12 is supported movably forward and backward in the optical axis O direction along the guide shaft 65 and the straight guide groove 13b via a feed screw 66 by a driving force of a focus driving unit 60 described later.

The guide protrusion 12c includes the two minute cylindrical portions in a width direction as described above. Thus, even if there is a slight displacement around the optical axis O due to dimensional accuracy of the fourth group frame 12, both the cylindrical portions of the guide protrusion 12c abut against the straight guide groove 13b in the fixed frame 13, thereby allowing a satisfactory fitting state without uneven contact to be maintained.

When an alignment mechanism of the fourth group lens 24 is applied to the fourth group 12, for example, when an eccentricity adjusting mechanism is incorporated into the guide shaft 65, the guide protrusion 12c is constituted by the minute cylindrical portion as described above, and thus the satisfactory fitting state between the straight guide groove 13b and the guide protrusion 12c can be maintained even with changes of the position of the fourth group frame 12 due to alignment. The guide protrusion 12c may include two minute spherical portions protruding in a width direction rather than the minute cylindrical portion.

Figure 12:
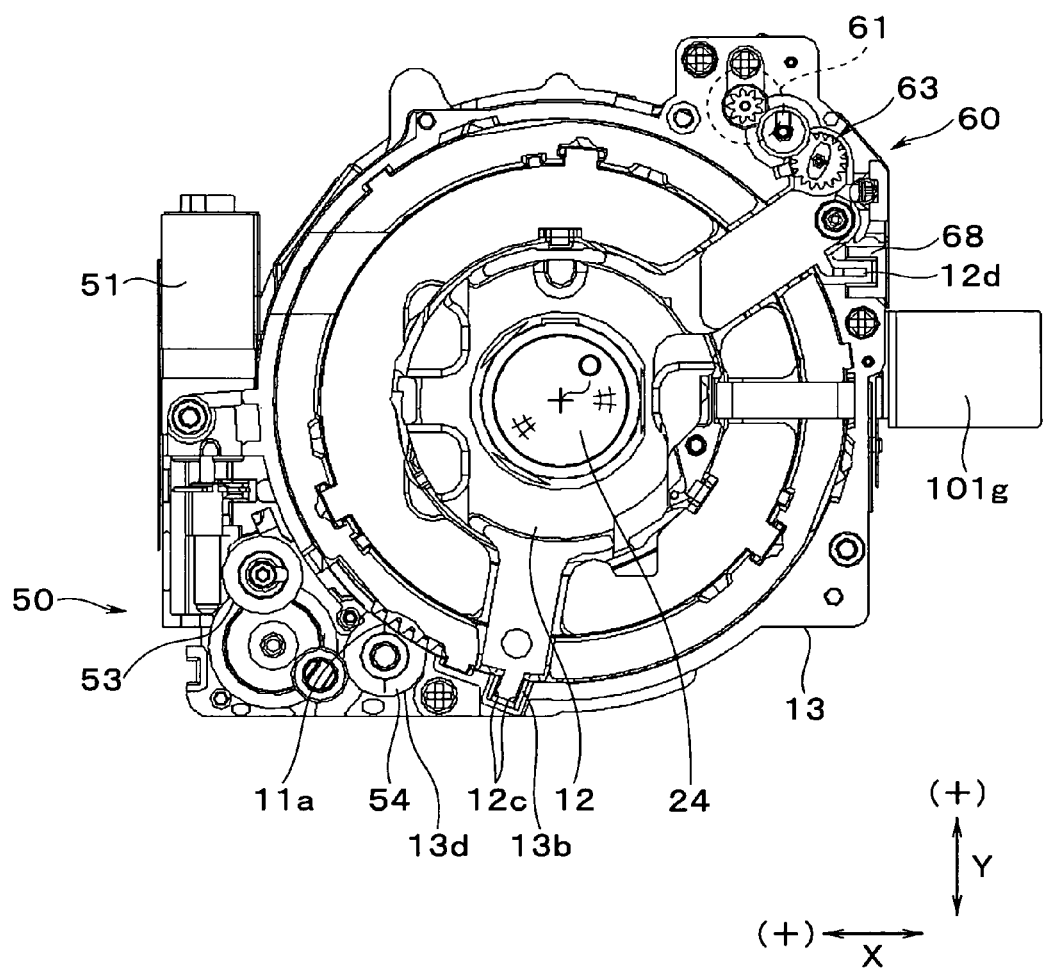
FIG. 12 is a sectional view taken along the line XII-XII in FIG. 6, showing the fourth group frame, the focus driving unit, and a zoom driving unit viewed from a back side.
Figure 13:
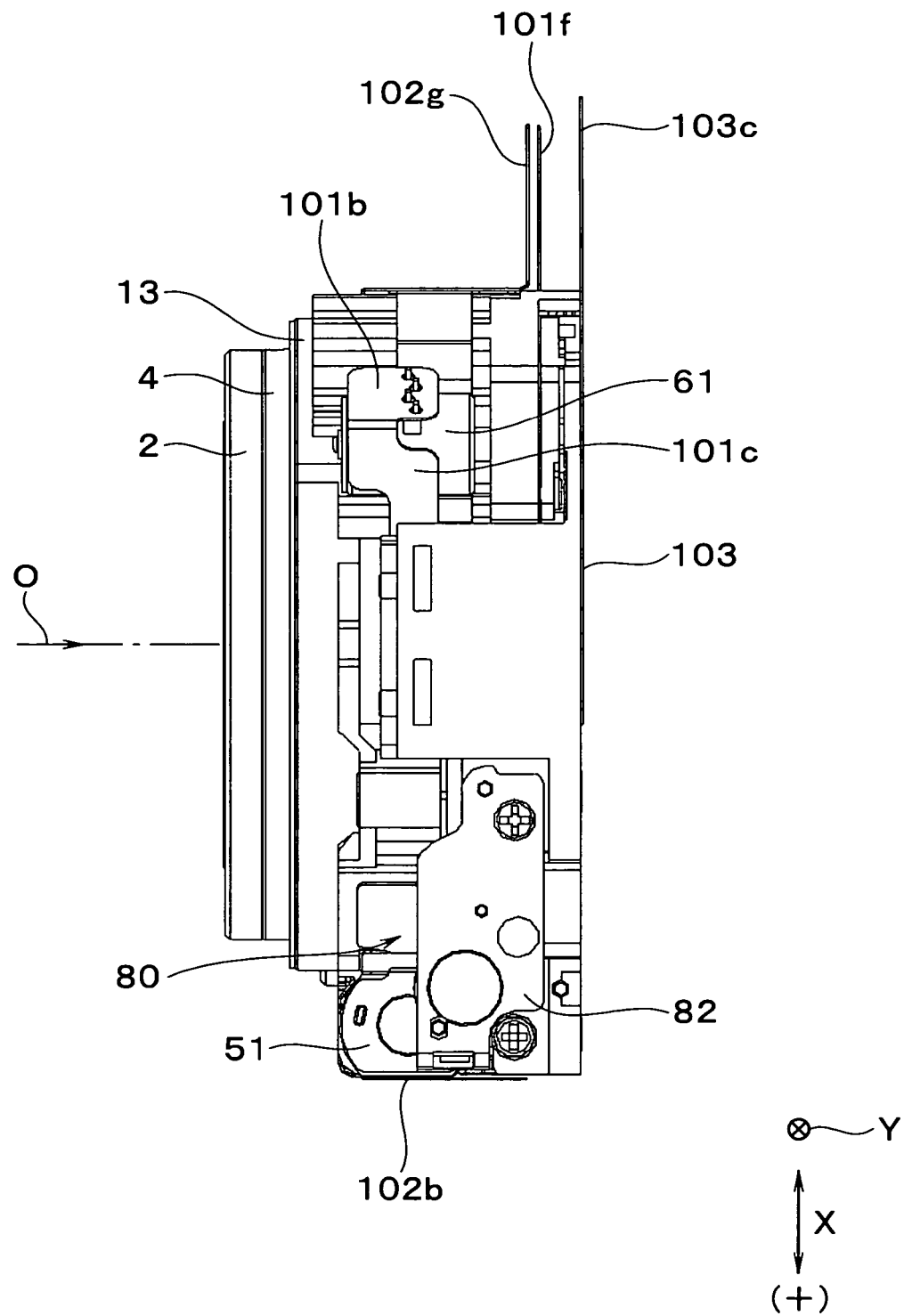
FIG. 13 is a plan view in the retracted state of the lens barrel in FIG. 1.
Figure 14:
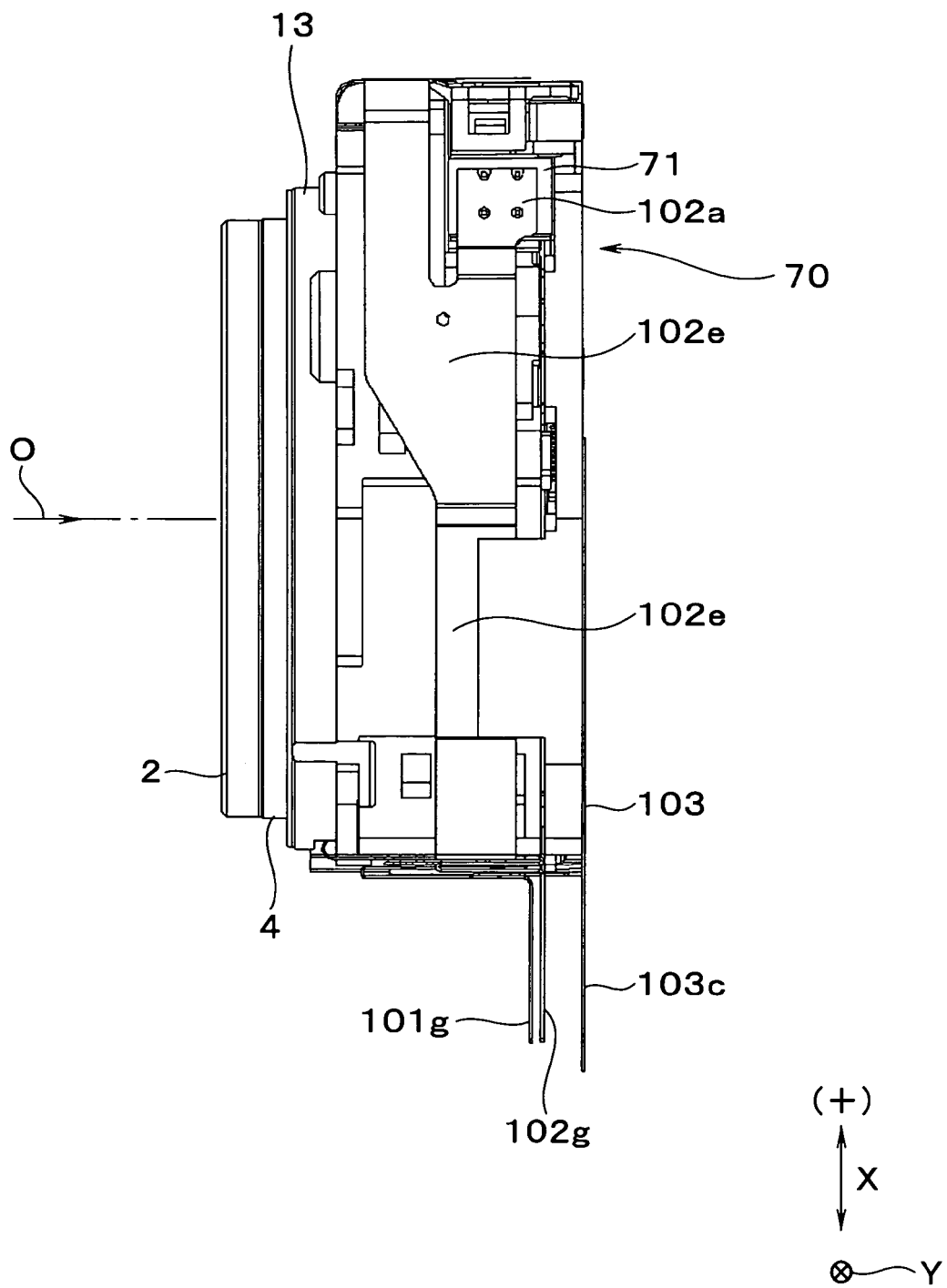
FIG. 14 is a bottom view in the retracted state of the lens barrel in FIG. 1.
Figure 15:
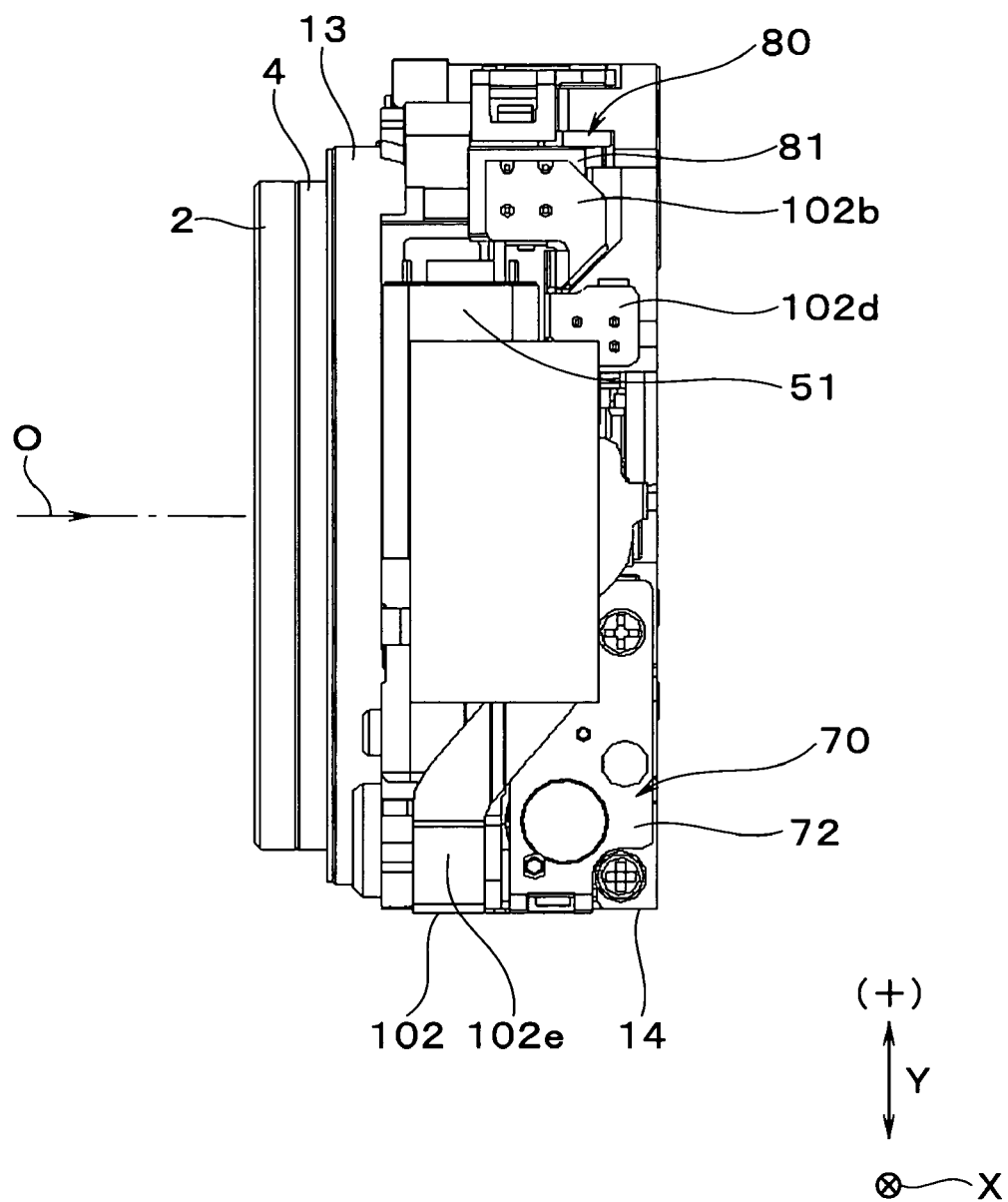
FIG. 15 is a right side view in the retracted state of the lens barrel in FIG. 1.
Figure 16:
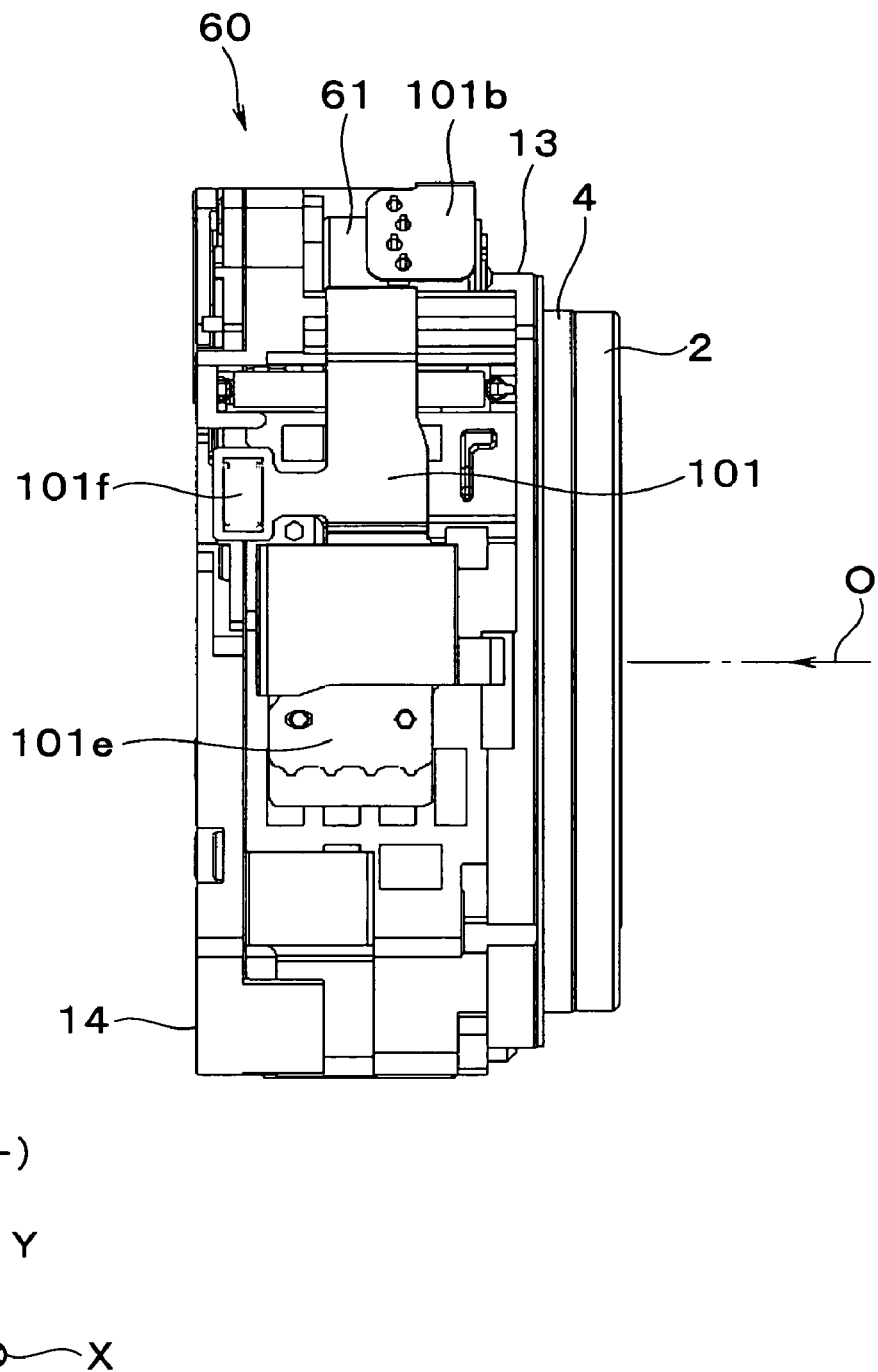
FIG. 16 is a left side view in the retracted state of the lens barrel in FIG. 1.
Figure 17:
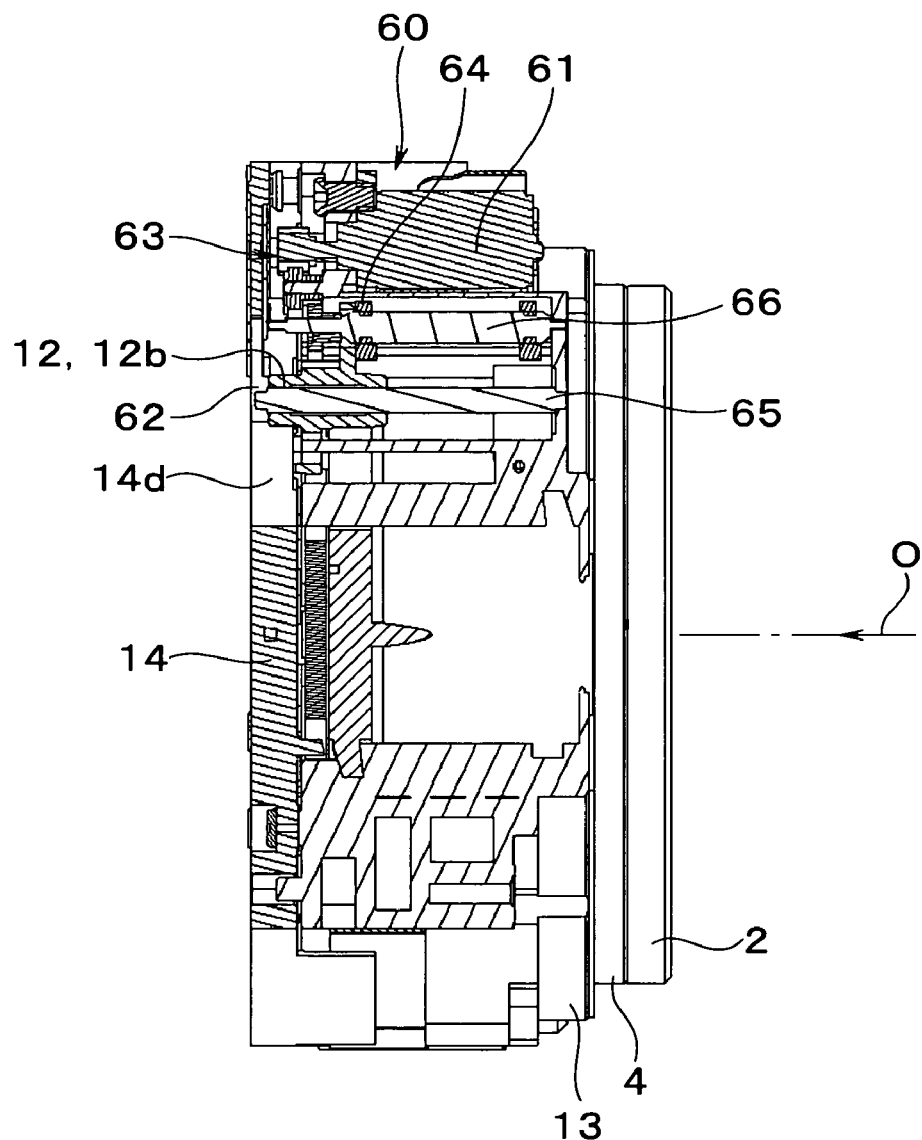
FIG. 17 is a partial sectional view in the retracted state of the lens barrel in FIG. 1 viewed from left, particularly showing a section of the focus driving unit.

As shown in FIGS. 2 and 12, the zoom driving unit 50 is placed on a right side (left side in FIG. 12) of a cylinder outer peripheral portion of the fixed frame 13, and includes a zoom motor 51 constituted by a DC motor, a gear case lid 52, and a gear train 53 and a long gear 54a that constitute a rotation transmitting mechanism.

The gear case lid 52 is secured to the right side of the fixed frame 13 from the back side, and has shaft holes that support shaft portions of the gear train 53 and the long gear 54.

The zoom motor 51 is supported by the fixed frame 13, and positioned between an X driving motor 71 and a Y driving motor 81 described later mounted to the base plate 14, and a worm gear is secured to an output shaft in the Y direction.

The gear train 53 includes a worm wheel that meshes with a worm gear of the zoom motor 51, and a reduction gear train that meshes with the worm wheel and the long gear 54.

The long gear 54 is housed in the gear housing recess 13d in the fixed frame 13 in a direction parallel to the optical axis O, and meshes with the gear portion 11a of the rotating frame 11.

In the zoom driving unit 50, when the zoom motor 51 is rotationally driven in retraction driving and zoom driving of the lens barrel 1, the rotating frame 11 is rotationally driven via the long gear 54 to advance or retract the lens barrel 1.

The focus driving unit 60 is placed in the upper left position on the cylinder outer peripheral portion as described above, and includes, as shown in FIGS. 4, 12 and 17, a focus motor 61 constituted by a step motor, a gear case lid 62, a guide shaft 65 that constitutes a rotation transmitting mechanism, a feed screw 66, a gear train 63, a nut 64, a fourth group frame biasing spring 67, and a focus origin detecting PI 68 as an origin detector constituted by a photo interrupter.

The gear case lid 62 is secured to the upper left position of the fixed frame 13 from the back side, and supports shaft ends of the guide shaft 65 and the feed screw 66 parallel to the optical axis O.

The focus motor 61 is supported by the fixed frame 13, and a pinion that meshes with the gear train 63 is mounted to an output shaft in the direction parallel to the optical axis O.

The guide shaft 65 is placed in parallel with the optical axis O, and slidably fits in the guide shaft hole 12a in the fourth group frame 12, and the shaft end is supported by the fixed frame 13 and the gear case lid 62.

The feed screw 66 is driven by the focus motor 61 via the gear train 63. A nut 64 is threaded on the feed screw 66, and an end surface of the feed screw insertion hole 12b of the fourth group frame 12 abuts against a rear surface of the nut 64. The nut 64 has a rotation-restricting protrusion guided by the fixed frame 13 in the rotation-restricted state.

The fourth group frame biasing spring 67 is constituted by a tensile spring, is provided between the fixed frame 13 and the fourth group frame 12, urges the fourth group frame 12 forward, and abuts the end surface of the feed screw insertion hole 12b in the fourth group frame 12 against the nut 64.

The PI 68 is secured to the fixed frame 13, and the sensor shielding piece 12d of the fourth group frame 12 can pass through the inside of the PI 68. When the camera is turned on, the PI 68 detects passage of the sensor shielding piece 12d of the fourth group frame 12, and focus origin position information of the fourth group frame 12 is captured by a camera control section (not shown).

A rear end of the focus driving unit 60 including the gear case lid 62 protrudes rearward from the back surface of the fixed frame 13, and the protruding portion enters a notch provided in the third corner portion 14d at a left upper corner of the base plate 14 of the shake correction image pickup unit 90 described later.

In the focus driving unit 60, when the focus motor 61 is rotationally driven in focus driving of the lens barrel 1, the feed screw 66 is rotationally driven and the nut 64 is moved forward and backward. The fourth group frame 12 is moved forward and backward in the optical axis O direction with the end surface of the feed screw insertion hole 12b abutting against the nut 64.

Now, first, second, third and fourth group lenses that constitute the image pickup optical system of the lens barrel 1 will be described. The first group lens 21 is constituted by a cemented lens of a negative meniscus lens 21a with a convex surface on a subject side and a biconvex positive lens 21b in order from the subject side, and moved toward the subject side from a wide-angle end to a telephoto end. The first group lens 21 is applied to advantageously reduce a thickness and a diameter, lens aberrations are cancelled each other to advantageously correct aberrations of the first group lens 21, and prevent aberration changes in obtaining a wider angle or a higher zooming ratio.

The second group lens 22 is constituted by a second group lens front group 22a and second group lens rear groups 22b and 22c in order from the subject side. The second group lens front group 22a is constituted by a negative meniscus lens with a convex surface on the subject side, and the second group lens rear groups 22b and 22c are constituted by a biconcave negative lens and a positive meniscus lens with a convex surface on the subject side.

The second group lens 22 is moved toward an image surface side from the wide-angle end to an intermediate state while increasing a distance from the first group lens 21 and reducing a distance from the third group lens 23, and moved toward the subject side from the intermediate state to the telephoto end while increasing a distance from the first group lens 21 and reducing a distance from the third group lens 23. At the telephoto end, the second group lens 22 is located closer to the subject side than at the wide-angle end.

The third group lens 23 includes a third group lens front group 23a and a third group lens rear group 23b in order from the subject side. The third group lens 23a is constituted by a biconvex positive lens, and the third group lens rear group 23b is constituted by a negative meniscus lens with a convex surface on the subject side. The third group lens 23 is moved toward the subject side from the wide-angle end to the telephoto end.

The fourth group lens 24 is constituted by one positive meniscus lens with a convex surface on the subject side. The fourth group lens 24 is driven forward and backward in focusing, further moved toward the subject side while increasing a distance from the group lens 23 from the wide-angle end to the intermediate state, and slightly moved toward the image surface side while increasing a distance from the third group lens 23 from the intermediate state to the telephoto end. At the telephoto end, the fourth group lens 24 is located closer to the subject side than at the wide-angle end.

The image pickup optical system is configured as described above, and thus a synthesized system of the first group lens 21 and the second group lens 22 brought close to each other at around the wide-angle end has a symmetric power arrangement including positive refractive power (first group lens 21), negative refractive power (second group lens front group 22a), and positive refractive power (second group lens rear groups 22b and 22c) in order from the subject side.

A synthesized system of the third group lens 23 and the fourth group lens 24 also has a symmetric power arrangement including positive refractive power (third group lens front group 23a), negative refractive power (third group lens rear group 23b), and positive refractive power (fourth group lens 24) in order from the subject side.

A synthesized system of the second group lens 22 and the third group lens 23 brought close to each other at around the telephoto end has symmetric arrangement including negative refractive power (second group lens front group 22a), positive refractive power (second group lens rear groups 22b and 22c), positive refractive power (third group lens front group 23a), and negative refractive power (third group lens rear group 23b) in order from the subject side.

This facilitates correction of Petzval sum, coma aberration, magnification chromatic aberration, and spherical aberration at around the wide-angle end, and correction of Petzval sum, coma aberration, and magnification chromatic aberration at around the telephoto end, thereby easily obtaining a wider angle and a higher zooming ratio. A principal point of the third lens group is easily set closer to the subject, thereby easily ensuring a zooming ratio.

Further, the fourth group lens 24 is constituted by one positive lens component to advantageously reduce the thickness in retraction. The fourth group lens 24 has a main function of separating an exit pupil from the image surface, and thus can reduce positive refractive power. Thus, the above-described configuration is advantageous for reducing the size and cost.

The shake correction image pickup unit 90 is constituted by a movable image pickup unit mounted to the back surface of the fixed frame 13, and includes the base plate 14 as a base member, a Y frame 15 supported on the base plate 14 movably in the Y direction on the XY plane, an X frame 16 supported on the Y frame 15 movably in the X direction on the XY plane, an image pickup device unit 95 fixedly supported on the X frame 16, an X driving unit 70 as a first driving section, and a Y driving unit 80 as a second driving section.

The base plate 14 is a substantially rectangular frame member having a middle aperture 14a, and an outline projection shape viewed from front having a first corner portion 14b at a lower right position (lower left position in FIG. 11) around the optical axis O, a second corner portion 14c at an upper right position (upper left position in FIG. 11), a third corner portion 14d at an upper left position (upper right position in FIG. 11), and a fourth corner portion 14e at a lower left position (lower right position in FIG. 11), and is fixed to the back surface of the fixed frame 13. When the base plate 14 is secured to the fixed frame 13, the shake correction image pickup unit 90 needs to be precisely positioned on the XY plane with respect to the optical axis O of the lens barrel, and thus the base plate 14 is secured to the fixed frame 13 with positioning holes 14f and 14g (FIG. 11) in the base plate 14 fitted on positioning pins on the fixed frame 13.

The third corner portion 14d has a notch, and the rear end of the focus driving unit 60 including the gear case lid 62 enters the notch as described above. The fourth corner portion 14e is a member placement escape portion along the outer periphery of the fixed frame 13. The escape portion is for placing a tripod female screw portion of the digital camera to which the lens barrel 1 is mounted.

The Y frame 15 is constituted by a frame member having an aperture 15a, placed in the middle aperture 14a in the base plate 14, and supported slidably in the Y direction by two guide shafts 91 and 92 while being urged by biasing springs.

The X frame 16 is constituted by a frame member having an aperture 16a, placed in the aperture 15a in the Y frame 15, and supported slidably in the X direction by two guide shafts 93 and 94 while being urged by biasing springs.

An image pickup device unit 95 includes an image pickup device support plate 98, an image pickup device 96 mounted to an FPC (flexible printed circuit board) 103 and secured to the image pickup device support plate 98, and constituted by a CCD or a CMOS, and an optical filter 97 such as an optical low-pass filter or an infrared ray cutting and absorbing filter provided on a front side of the image pickup device 96. A surface of the optical low-pass filter may be directly coated with a near-infrared sharp cut coat.

The image pickup device unit 95 is mounted to the X frame 16 with the image pickup device support plate 98 secured to the back surface of the X frame 16 by a screw, and the image pickup device 96 and the optical filter 97 placed in the aperture 16a in the X frame 16.

Figure 10:
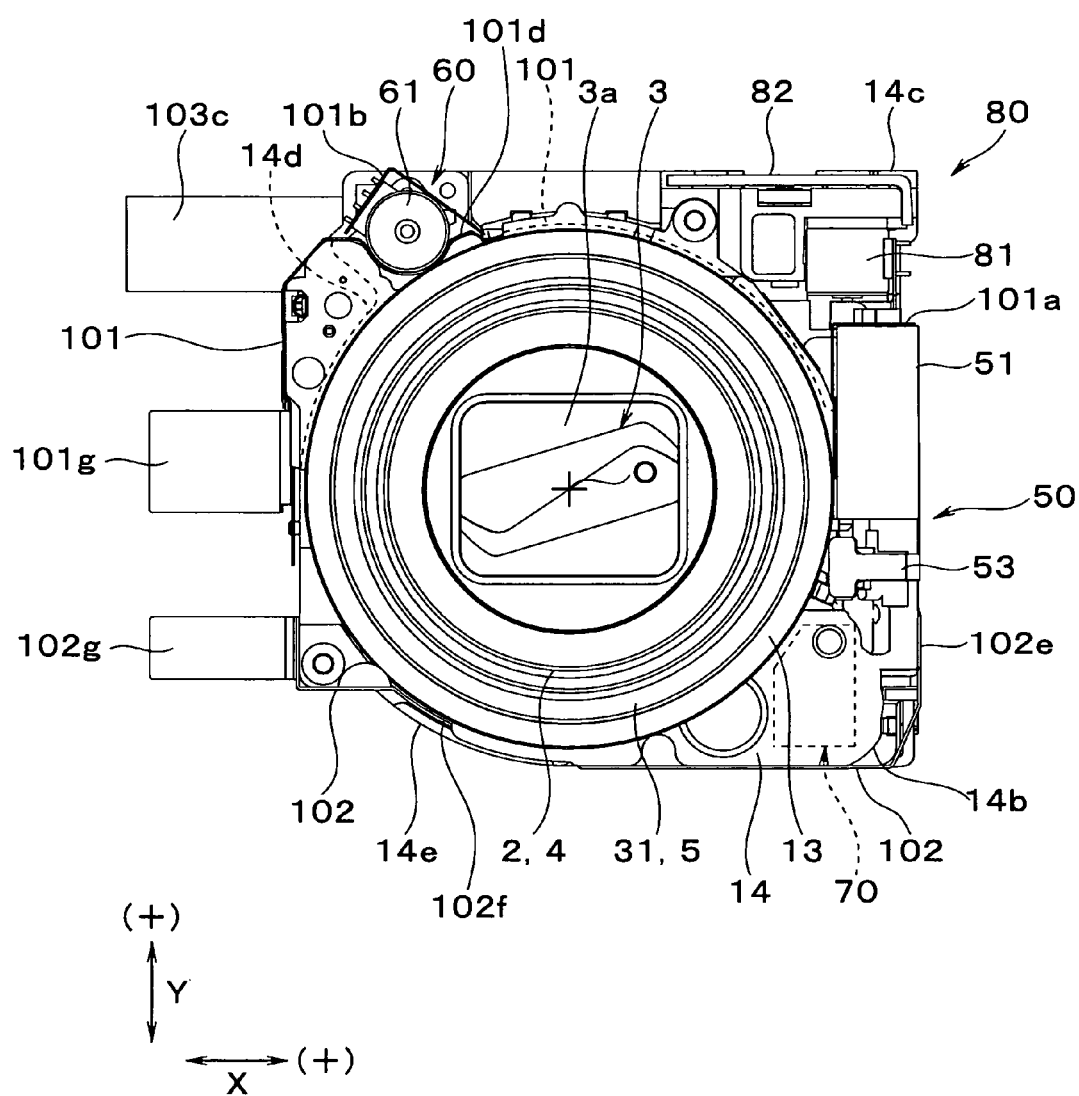
FIG. 10 is a front view of the lens barrel in FIG. 1.
Figure 11:
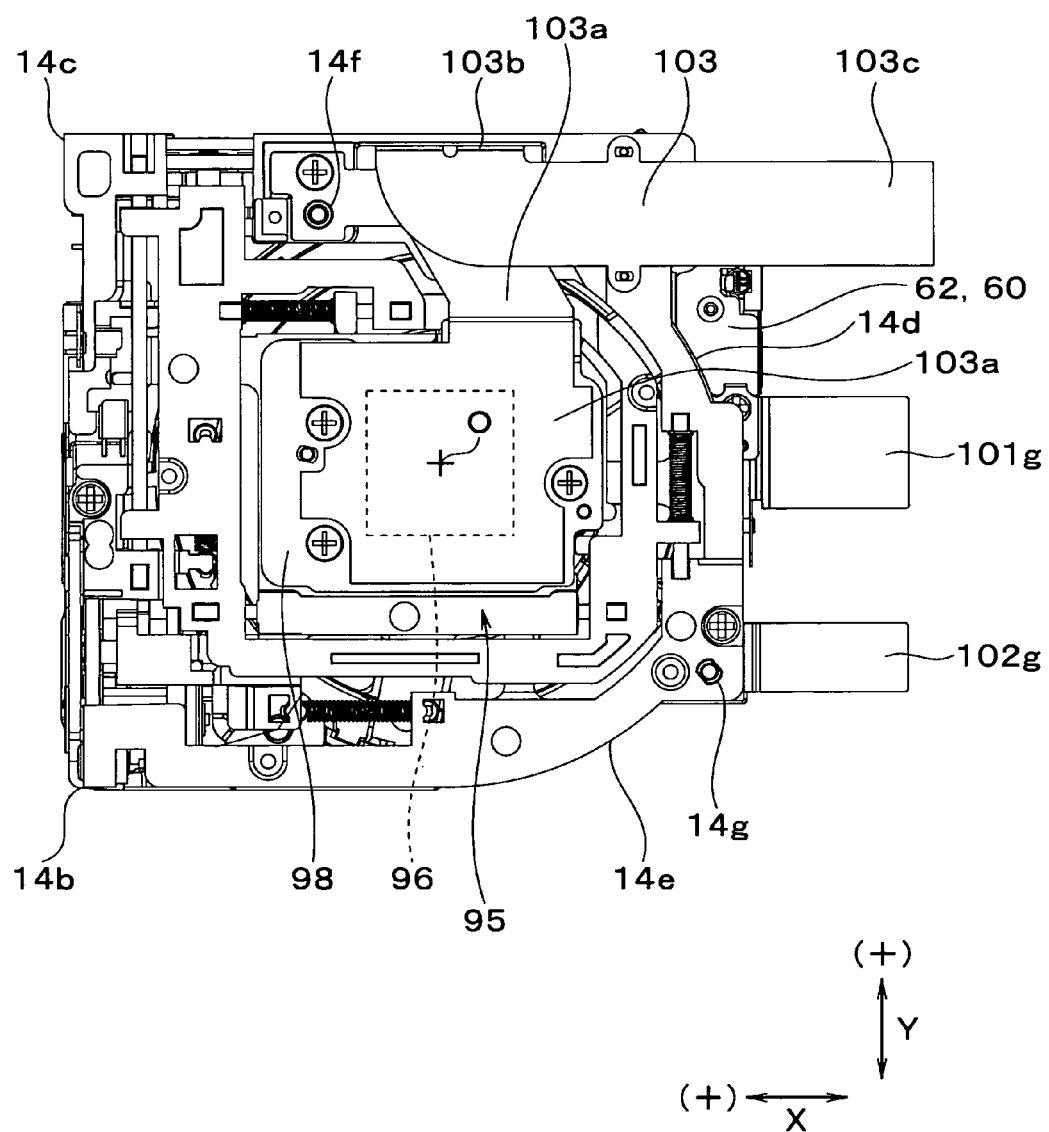
FIG. 11 is a back view of the lens barrel in FIG. 1.

An X driving unit 70 is assembled to the front side of the first corner portion 14b at the upper right position of the base plate 14, and placed overlapping a rear position of the gear train 53 of the zoom driving unit 50 on the outer peripheral portion of the fixed frame 13 (FIG. 10). The X driving unit 70 includes an X driving unit support plate 72, an X driving motor 71 as a first motor constituted by a step motor, an intermediate gear 73 that meshes with a pinion of an output shaft of the X driving motor 71, a feed screw 74 in the X direction to which the intermediate gear 73 is secured, a nut 75, and a PI (photo interrupter) 76 as an X frame initial position detecting sensor. Instead of the position detector of the PI 76, a position detector may be placed that detects an initial position with a combination of a photoreflector or a hall element and a flat permanent magnet.

The nut 75 is threaded on the feed screw 74 in the rotation-restricted state of the X frame 16, supported slidably in the X direction, and receives a biasing force of a biasing spring and abuts against a U-shaped notch 16b in the X frame 16. Thus, when the X driving motor 71 is rotationally driven in the shake correction operation, the feed screw 74 drives the nut 75 and the X frame 16 to be displaced in the direction.

A Y driving unit 80 is assembled to a front side of the second corner portion 14c of the base plate 14, and placed in an upper position of the zoom motor 51 on the outer peripheral portion of the fixed frame 13. The Y driving unit 80 includes a Y driving unit support plate 82, a Y driving motor 81 as a second motor constituted by a step motor, an intermediate gear 83 that meshes with a pinion of an output shaft of the Y driving motor 81, a feed screw 84 in the Y direction to which the intermediate gear 83 is secured, a nut 85, and a PI (photo interrupter) 86 as a Y frame initial position detecting sensor.

The nut 85 is threaded on the feed screw 84 in the rotation-restricted state of the Y frame 15, supported slidably in the Y direction, and receives a biasing force of a biasing spring and abuts against a U-shaped notch 15b in the Y frame 15. Thus, when the Y driving motor 81 is rotationally driven in the shake correction operation, the feed screw 84 drives the nut 85 and the Y frame 15 to be displaced in the Y direction.

In the shake correction image pickup unit 90, the Y frame 15 and the X frame 16 are driven to be displaced on the XY plane with camera shake in an image pickup device exposure operation by camera shake correction, and after the camera shake correction operation is finished, or immediately after a power switch of the digital camera is turned on, the Y frame 15 and the X frame 16 are returned to respective initial intermediate positions based on output signals of the PI 86 and the PI 76. When the Y frame 15 and the X frame 16 are in the initial intermediate positions, a central position of a light receiving surface of the image pickup device 96 matches the optical axis O.

In the shake correction image pickup unit 90, the X driving unit 70 and the Y driving unit 80 may be placed on the base plate 14 in a vertically inverse manner to the placement described above such that the X driving unit 70 is placed in the first corner portion 14b and the Y driving unit 80 is placed in the second corner portion 14c.

In the above-described lens barrel 1, an exterior color of the zoom motor 51, the focus motor 61, the Y driving motor 81, and the X driving motor 71 is black, or for example, silver other than black, and an exterior color of the fixed frame 13 and the base plate 14 is a color other than black, for example, silver, or black. The components and the motors thus have different exterior colors, and thus an assembling state in an assembling process is checked, for example, the zoom motor 51, the focus motor 61, the Y driving motor 81, and the X driving motor 71 being mounted to the above-described predetermined positions on the fixed frame 13 and the base plate 14 is checked, and the base plate 14 can be secured to the fixed frame 13.

Next, arrangement on an FPC (flexible printed circuit board) for electrical connection between an electric control element of each component unit of the lens barrel 1 and a control section of the digital camera will be described with reference to FIGS. 2, 12 to 16.

The electrical connection FPC included in the lens barrel 1 includes an FPC 101 for electrical connection between the zoom and focus driving units 50 and 60 and the shutter/diaphragm control unit 8 and the camera electrical control section, an FPC 102 for electrical connection between the X and Y driving units 70 and 80 and the camera electrical control section, and an FPC 103 for electrical connection between the image pickup device unit 95 and the camera electrical control section.

The FPC 101 includes a zoom motor connector portion 101a, a focus motor connector portion 101b, a focus position detecting PI connector portion 101f, a connecting extending portion 101c to the focus motor connector portion, a left extending portion 101d, a camera electric control connector portion 101g, a shutter/diaphragm control unit FPC connector portion 101e, and further a zoom position detecting PI connector and a PR connector (FIG. 2).

In the FPC 101, as shown in FIG. 10, the zoom motor connector portion 101a placed at one end is connected to a terminal portion of the zoom motor 51. The left extending portion 101d of the FPC 101 is extended to the left along the upper outer peripheral portion of the fixed frame 13, and the focus motor connector portion 101b branching off at the connecting extending portion 101c in the middle is connected to a terminal portion of the focus motor 61. The left extending portion 101d passes through the upper outer periphery of the fixed frame 13, and then the PI connector portion 101f branching off rearward is connected to the PI 68. After passing through the upper outer periphery of the fixed frame 13, the branching shutter/diaphragm control unit FPC connector portion 101e is connected to a shutter/diaphragm control unit FPC (not shown). The FPC 101 passes leftward through the upper outer periphery of the fixed frame 13, and then the camera electric control connector portion 101g extending to the left is connected to the camera electric control section (not shown).

The FPC 102 includes an X motor connector portion 102a, a Y motor connector portion 102b, PI connector portions 102c and 102d, a laterally extending portion 102e, a downward extending portion 102f, and a camera electric control connector portion 102g (FIG. 2).

In the FPC 102, the Y motor connector portion 102b is connected to the Y driving motor 81, the PI connector portion 102d is connected to the PI 86, and further the PI connector portion 102c is connected to the PI 76, then the laterally extending portion 102e is passed through along an outer periphery of a right side surface of the fixed frame 13. Further, the X motor connector portion 102a is connected to the X driving motor 71, and then the downward extending portion 102f is passed through along a lower outer periphery of the fixed frame. The camera electric control connector portion 102g extending to the left is connected to the camera electrical control section (not shown).

The FPC 103 includes an image pickup device mounting connecting portion 103a, a V-shaped bent portion 103b having a middle slit for supporting the image pickup device 96 displaceably on the XY plane, and a camera electric control connector portion 103c (FIG. 2).

In the FPC 103, after the mounting connecting portion 103a is connected to the image pickup device 96, the back surface of the base plate 14 is passed through to the left via the V-shaped bent portion 103b housed in the FPC bent portion housing recess 14f (FIG. 6) of the base plate 14, and the camera electric control connector portion 103c extending to the left is connected to the camera electrical control section (not shown).

The retraction operation, the advance operation, the shake correction operation, or the like of the lens barrel 1 of the present embodiment having the above-described configuration will be described.

The lens barrel 1 is set to the photographable wide-angle state or telephoto state shown in FIGS. 7 and 8 by the advance operation from the retracted state shown in FIG. 6. Specifically, the zoom motor 51 is driven while being controlled by the camera control section, and the rotating frame 11 is rotated and driven to advance. With the rotation and advance of the rotating frame 11, the barrier unit 3 is first opened, and the first group frame 4, the second group frame 6, the third group frame 7, and the shutter/diaphragm unit 8 are moved to respective zoom positions based on distance measuring signals. The focus motor 61 is driven based on the distance measuring signals, the fourth group frame 12 is advanced to the focus position, and the lens barrel 1 enters a photographable state.

In shake correction photographing, when exposure of the image pickup device 96 is performed, the X driving motor 71 and the Y driving motor 81 are driven while being controlled by the control section of the digital camera based on a camera shake signal detected by a camera shake detecting sensor of the digital camera, this causes the Y frame 15 and the X frame 16 to be displaced, and the image pickup device 96 is driven in a direction for correcting the camera shake. The image pickup device 96 placed on the X frame 16 and driven in the camera shake correcting direction outputs an image pickup signal without camera shake.

When the lens barrel 1 is retracted from the photographable state to the retracted state, the zoom motor 51 and the focus motor 61 are driven to retract the movable frame members toward the fixed frame 13 to enter the retracted state. In the retracted state, the movable frame members are brought into tight or substantially tight contact with each other, and the first group lens 22 to the fourth group lens 24 are also brought into substantially tight contact with each other. This can reduce an entire length of the lens barrel 1 in the optical axis O direction in the retracted state.

Particularly, the first group frame 4, the second group frame 6, and the third group frame 7 are retracted so as to be brought close to each other. Specifically, as described above, the cam grooves 5c in the cam frame 5 in which the cam follower 39 of the second group frame 6 fits are constituted by cam grooves with different groove widths, and when the lens barrel 1 is in the retracted state, the cam follower 39 fits in a cam groove with a large fitting gap.

Specifically, when the lens barrel 1 is in the retracted state, the cam follower 39 is movable by a fitting gap with respect to the cam groove 5c. Thus, when the lens barrel 1 is in the retracted state, and for example, the first group frame 4 interferes with the second group frame 6 due to variations in shape size, the second group frame 6 is moved rearward against the biasing force of the conical coil spring 18. Thus, when the first group frame 4 interferes with the second group frame 6, the lens barrel 1 can be retracted without the retraction operation being interrupted.

On the other hand, as described above, in retraction, the shutter blade 25 and the diaphragm blade 26 of the shutter/diaphragm control unit 8 are driven to a position with an opened aperture, and with retraction of the lens barrel 1, the shutter/diaphragm control unit 8 is moved forward with respect to the third group frame 7 against the biasing force of the compression spring 42.

Thus, in the retracted state, a rear portion of the third group lens 23 and a holding frame thereof enter the aperture in the shutter/diaphragm control unit 8, the shutter/diaphragm control unit 8 and the third group frame 7 can be further brought into substantially tight contact with each other, and simultaneously brought extremely close to the fourth group lens 24. Further, the shutter/diaphragm control unit 8 causes a part of the third group lens 23 having a smaller diameter than the fourth group lens 24 to enter the aperture in the shutter/diaphragm control unit 8, thereby reducing sizes of the aperture and the unit itself, suitably reducing the length of the lens barrel 1 in the optical axis direction in the retracted state without increasing cost, and reducing a thickness of the camera unit. Further, the image pickup optical system includes the first group lens 21 constituted by two lenses and the fourth group lens 24 constituted by one positive lens, thereby further reducing the length in the optical axis O direction of the image pickup optical system in the tight contact state in retraction.

The image pickup apparatus according to the present invention can reduce the entire length of the lens barrel 1 in the optical axis O direction in the retracted state for the above-described reasons.

As described above, the zoom driving unit 50 for driving the lens barrel forward and backward is placed on the right side of the outer peripheral portion of the fixed frame 13, and the focus driving unit 60 is placed in the upper left position on the outer peripheral portion of the fixed frame 13. Further, the X driving unit 70 and the Y driving unit for shake correction are placed in upper and lower right corner portions of the base plate 14 so as not to create dead spaces in the upper and lower positions of the zoom motor 51 on the right side of the outer peripheral portion of the fixed frame 13.

Further, the FPC 101 for connecting the zoom driving unit 50, the focus driving unit 60, the shutter/diaphragm unit 8, and the camera control section, and the FPC 102 for connecting the X driving unit 70, the Y driving unit, and the camera control section are placed to extend toward the camera control section along the upper and lower positions of the outer peripheral portion of the fixed frame 13. With these placement structures, the lens barrel 1 including the shake correction image pickup unit 90 can reduce a projection area in the optical axis O direction, thereby reducing the size of the lens barrel 1 as the image pickup apparatus.

The image pickup apparatus of the present embodiment described above is a camera unit including a retractable lens barrel that holds a plurality of lens groups that have a fixed frame member and a movable frame member rotationally driven with respect to the fixed frame member and moved forward and backward, and constitute an image pickup optical system, and an aperture control member that has an aperture through which an image pickup light flux from the image pickup optical system passes, and controls to narrow or open/close the aperture, a base member fixedly supported by the fixed frame member, and an image pickup device that is supported by base member, and converts a subject image formed by the image pickup optical system into an electric signal, wherein a predetermined lens group located on a side closer to a subject than a lens group located immediately before the image pickup device among the plurality of lens groups, or the aperture control member are held by a frame member driven forward and backward by the movable frame member, the aperture control member or the predetermined lens group is supported displaceably via a biasing member so as to be apart from the frame member in the image pickup optical axis direction of the image pickup optical system on an image side of the frame member, the base member includes a stopper member that abuts against the aperture control member or a holding frame that holds the predetermined lens group in retraction of the movable frame member, in a rotation position where the movable frame member can pick up an image, rotation of the movable frame member causes the predetermined lens group and the aperture control member to be moved together in the image pickup optical axis direction with the biasing member holding a predetermined distance therebetween, and in retraction where the movable frame member cannot pick up an image, with the aperture of the aperture control member opened, the aperture control member or the holding frame of the predetermined lens group is abutted against the stopper member with retraction of the movable frame member, the aperture control member or the predetermined lens group is displaced to the subject side with respect to the frame member against the biasing force of the biasing member, and at least a part of the predetermined lens group or the holding frame enters the aperture.

The image pickup apparatus of the present embodiment having such a configuration can suitably reduce the length of the lens barrel in the optical axis direction in the retracted state without increasing cost, thereby reducing a thickness.

In the image pickup apparatus of the present embodiment, the predetermined lens group is supported by the frame member, and the aperture control member is supported on the image side of the frame member via the biasing member.

In the image pickup apparatus of the present embodiment, the movable frame member includes a rotating frame rotationally driven with respect to the fixed frame member and moved forward and backward, and a cam frame rotationally driven by rotation of the rotating frame and moved forward and backward, is supported by the cam frame relatively movably forward and backward with rotation of the first group lens and the second group lens being controlled from the subject side to the image side, the third group lens as the predetermined lens group and the aperture control member are supported by the rotating frame, and the focusing fourth group lens driven forward and backward in the image pickup optical axis direction is supported by the fixed frame member.

In the image pickup apparatus of the present embodiment, the first group lens is constituted by one negative refractive power lens and one positive refractive power lens, the second group lens is constituted by a negative refractive power lens group and a positive refractive power lens group, the third group lens is constituted by a positive refractive power lens group and a negative refractive power lens group, and the fourth group lens is constituted by one positive refractive power lens.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus comprising:
a fixed frame;
an image pickup optical system having a focus lens group and a zoom lens group;
a focus lens holding frame holding the focus lens group;
a zoom lens holding frame holding the zoom lens group;
a focus driving unit provided on an outer peripheral portion of the fixed frame, and including a focus motor for focus driving of the focus lens group and a rotation transmitting mechanism of the focus motor;
a zoom driving unit provided on the outer peripheral portion of the fixed frame and including a zoom motor for zoom driving of the zoom lens group and a rotation transmitting mechanism of the zoom motor;
an image pickup device that receives an optical image formed via the image pickup optical system;
a base member that is coupled to the fixed frame, and supports the image pickup device displaceably in a first direction and a second direction perpendicular to the first direction in a plane parallel to a light receiving surface of the image pickup device;
a first driving section provided on the base member, and including a first motor that drives the image pickup device in the first direction; and
a second driving section including a second motor that drives the image pickup device in the second direction,
wherein the base member includes a first corner portion in which at least the first driving section or the second driving section is mounted, a second corner portion in which the second driving section or the first driving section is mounted, a third corner portion located on a side opposite to the first corner portion via an optical axis of the image pickup optical system, and having a notch that a protruding portion from the fixed frame of the focus driving unit enters, and a fourth corner portion located on a side opposite to the second corner portion via the optical axis of the image pickup optical system,
the zoom driving unit is configured so that the zoom motor is placed between the first driving section and the second driving section in an optical axis direction of the image pickup optical system with respect to the fixed frame, and the rotation transmitting mechanism of the zoom motor is placed overlapping the first driving section or the second driving section on a side closer to a subject of the image pickup optical system than the first driving section or the second driving section, and a member placement escape portion is formed in the fourth corner portion of the base member.

2. The image pickup apparatus according to claim 1, further comprising:
an origin detector used for detecting an origin in the focus driving;
a shutter driving unit for driving a shutter; and
a flexible printed circuit board on which a signal wire from the origin detector, and drive wires for zoom driving, focus driving, and shutter driving are placed,
wherein the flexible printed circuit board extends along an outer peripheral portion of the fixed frame.

3. The image pickup apparatus according to claim 1, wherein an exterior color of the fixed frame and the base member is different from an exterior color of the first motor and the second motor.

4. The image pickup apparatus according to claim 2, wherein an exterior color of the fixed frame and the base member is different from an exterior color of the first motor and the second motor.

* * * * *